(12) United States Patent
Zhang et al.

(10) Patent No.: US 11,977,829 B2
(45) Date of Patent: May 7, 2024

(54) GENERATING SCALABLE AND SEMANTICALLY EDITABLE FONT REPRESENTATIONS

(71) Applicant: Adobe Inc., San Jose, CA (US)

(72) Inventors: Zhifei Zhang, San Jose, CA (US);
Zhaowen Wang, San Jose, CA (US);
Hailin Jin, San Jose, CA (US);
Matthew Fisher, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 269 days.

(21) Appl. No.: 17/362,031

(22) Filed: Jun. 29, 2021

(65) Prior Publication Data

US 2022/0414314 A1 Dec. 29, 2022

(51) Int. Cl.
*G06F 40/109* (2020.01)
*G06N 3/045* (2023.01)
*G06T 11/20* (2006.01)

(52) U.S. Cl.
CPC .......... *G06F 40/109* (2020.01); *G06N 3/045* (2023.01); *G06T 11/203* (2013.01)

(58) Field of Classification Search
None
See application file for complete search history.

(56) References Cited

U.S. PATENT DOCUMENTS

| 2019/0385346 | A1* | 12/2019 | Fisher | G06F 40/109 |
| 2021/0334666 | A1* | 10/2021 | Lundin | G06N 3/088 |
| 2022/0284175 | A1* | 9/2022 | Schwiebert | G06F 40/279 |
| 2023/0022257 | A1* | 1/2023 | Jodoin | G16H 30/40 |

OTHER PUBLICATIONS

Wang, Yizhi, Yue Gao, and Zhouhui Lian. "Attribute2Font: creating fonts you want from attributes." ACM Transactions on Graphics (TOG) 39, No. 4 (2020): 69-1.

Sitzmann, Vincent, Julien Martel, Alexander Bergman, David Lindell, and Gordon Wetzstein. "Implicit neural representations with periodic activation functions." Advances in Neural Information Processing Systems 33 (2020).

Mildenhall Ben, Pratul P. Srinivasan, Matthew Tancik, Jonathan T. Barron, Ravi Ramamoorthi, and Ren Ng. "Nerf: Representing scenes as neural radiance fields for view synthesis." In European Conference on Computer Vision, pp. 405-421. Springer, Cham, 2020.

* cited by examiner

*Primary Examiner* — Jeffrey J Chow
(74) *Attorney, Agent, or Firm* — Keller Preece PLLC

(57) ABSTRACT

The present disclosure relates to systems, methods, and non-transitory computer readable media for accurately and flexibly generating scalable and semantically editable font representations utilizing a machine learning approach. For example, the disclosed systems generate a font representation code from a glyph utilizing a particular neural network architecture. For example, the disclosed systems utilize a glyph appearance propagation model and perform an iterative process to generate a font representation code from an initial glyph. Additionally, using a glyph appearance propagation model, the disclosed systems automatically propagate the appearance of the initial glyph from the font representation code to generate additional glyphs corresponding to respective glyph labels. In some embodiments, the disclosed systems propagate edits or other changes in appearance of a glyph to other glyphs within a glyph set (e.g., to match the appearance of the edited glyph).

20 Claims, 12 Drawing Sheets

GENERATING SCALABLE AND SEMANTICALLY EDITABLE FONT REPRESENTATIONS

BACKGROUND

Existing hardware and software platforms provide systems and methods for editing fonts to modify scale, style, and serif. For example, engineers have developed some conventional font editing systems that utilize vector formats for presenting fonts, and engineers have also developed other conventional font editing systems to modify fonts in the pixel space. Despite these advances, however, many conventional font editing systems continue to demonstrate a number of deficiencies or drawbacks, particularly in accuracy and flexibility.

For example, many conventional font editing systems inaccurately edit font glyphs. While conventional pixel-based systems provide some level of editability across glyphs (e.g., via style transfer techniques), these prior systems nevertheless degrade the appearance of glyphs when upscaling. Indeed, glyphs represented in the pixel space lose detail and experience degradations in appearance when increasing their scale (e.g., from a smaller glyph to a larger glyph), and sometimes even when decreasing their scale. Additionally, some conventional systems fail to adequately capture or replicate font resemblance when generating glyphs, often generating glyphs that appear out of place in relation to other glyphs within a glyph set.

In addition to their inaccuracy, some conventional font editing systems are inflexible when editing glyphs. More specifically, vector-based conventional systems sometimes provide better scalability than pixel-based systems but nevertheless require individual editing of each glyph in a font set. Indeed, to maintain consistent appearance across multiple glyphs in a set, many conventional systems rigidly require editing every glyph in the set individually (e.g., due to limitations of conventional style transfer techniques).

SUMMARY

This disclosure describes one or more embodiments of systems, methods, and non-transitory computer readable media that solve one or more of the foregoing or other problems in the art with a machine learning approach for generating scalable and semantically editable font representations. Particularly, to represent a glyph, the disclosed systems generate a first-of-its-kind font representation code utilizing deep learning. In some embodiments, the disclosed systems achieve scalability and semantic editability for font representations by utilizing importance-aware sampling and weighted loss for training a glyph appearance propagation model (e.g., by training a meta-network jointly with a deep implicit function network). Additionally, based on a generated font representation code and by leveraging the glyph appearance propagation model, in certain embodiments, the disclosed systems automatically propagate edits or other changes in appearance of a glyph to other glyphs within a glyph set (e.g., to match the appearance of the edited glyph). By training and implementing the glyph appearance propagation model in accordance with this disclosure, the disclosed systems exhibit improved accuracy and flexibility in glyph generation compared to conventional font editing systems.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which.

DETAILED DESCRIPTION

Figure 1:
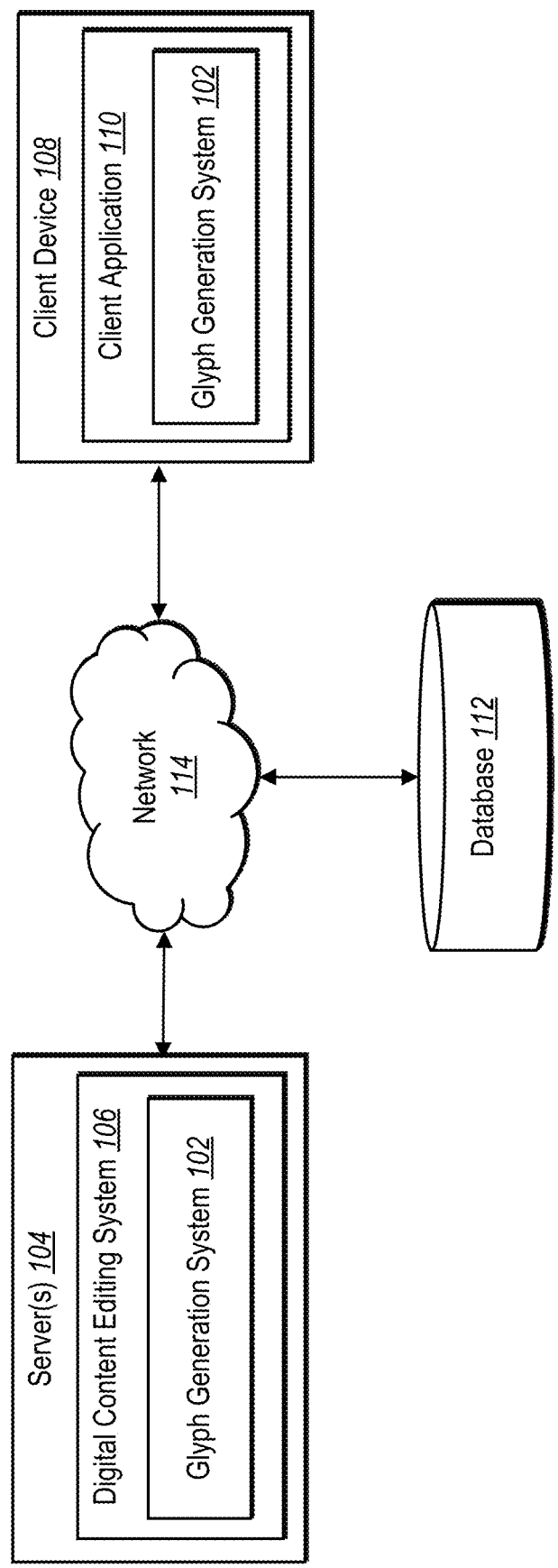
FIG. 1 illustrates an example system environment in which a glyph generation system operates in accordance with one or more embodiments.

This disclosure describes one or more embodiments of a glyph generation system that accurately and flexibly generates font representation codes for glyphs utilizing a glyph appearance propagation model. In particular, in some embodiments, the glyph generation system utilizes a glyph appearance propagation model to determine a font representation code corresponding to a particular user-selected or user-modified glyph. As explained in greater detail below, the font representation code allows for semantic editing of the glyph and rendering at arbitrary scales without degradation.

As just mentioned, in one or more embodiments, the glyph generation system generates a font representation code based on a glyph. To elaborate, in certain cases, the glyph generation system generates a font representation code that represents a font of a template glyph input. For example, the glyph generation system utilizes the glyph appearance propagation model to generate or determine an unknown (or modified or customized) font corresponding to the glyph. In some embodiments, the glyph generation system determines a glyph label for the glyph (e.g., by utilizing a text recognition model) and utilizes the glyph label together with the glyph as a basis for generating a font representation code.

To elaborate, in one or more implementations, the glyph generation system performs an iterative process to generate a font representation code for a font corresponding to the glyph based on the glyph and an associated glyph label. For instance, the glyph generation system initializes the font representation code and then iteratively generates successive versions of predicted glyphs from respective font representation codes, comparing the predicted glyphs to the actual glyph at each iteration. In certain embodiments, the glyph generation system predicts a new font representation code at each iteration (e.g., by modifying the font representation code from the previous iteration) and generates a new predicted glyph from each newly predicted font representation code. In these or other embodiments, the glyph generation system compares the predicted glyph with the initial glyph by determining a distance or a loss between them. In certain cases, the glyph generation system selects a predicted font representation code from one of the iterations whose predicted glyph satisfies a similarity metric (e.g., a threshold measure of loss or a threshold distance) as the font representation code corresponding to the initial glyph (e.g., representing a font of the initial glyph).

To generate accurate font representation codes, in one or more embodiments, the glyph generation system learns parameters for the glyph appearance propagation model. For instance, the glyph generation system learns parameters by training the glyph appearance propagation model utilizing an importance-aware sampling technique. More particularly, in some cases, the glyph generation system conducts importance-aware sampling by sampling more points or locations around edges or boundaries of sample glyphs during training and fewer, sparser points from background or non-boundary portions of the sample glyphs. In certain implementations, the glyph generation system trains a glyph appearance propagation model that includes a meta-network jointly trained together with a deep implicit function network such as a sinusoidal representation network ("SIREN network").

In one or more embodiments, the glyph generation system utilizes a font representation code for a template glyph to generate a complete set of glyphs in a font of the template glyph. In particular, the glyph generation system utilizes the glyph appearance propagation model to generate additional glyphs resembling an appearance of a template glyph based on a font representation code of the template glyph. For instance, the glyph generation system generates a font representation code for a font of the template glyph. Utilizing the font representation code, in some embodiments, the glyph generation system further generates additional glyphs modeled in appearance after the template glyph (e.g., to generate a complete glyph set). In some cases, the glyph generation system receives one or more modifications to a glyph and utilizes the glyph appearance propagation model to automatically propagate the modifications to other glyphs (e.g., to match the appearance of the modified glyph).

In addition to automatically propagating the appearance of a glyph (e.g., for semantic editing), in some embodiments, the glyph generation system scales glyphs as well. For example, the glyph generation system upscales or downscales glyphs to increase or decrease their size without degrading appearance or losing detail. In some cases, the glyph generation system leverages properties of the font representation code, which is a deep implicit function representation corresponding to a glyph, to scale the glyph for different sizes. Indeed, due to the continuity of the font representation code, in some embodiments, the glyph generation system is able to achieve arbitrary scales of a glyph.

In one or more embodiments, the glyph generation system further generates complete glyphs from partial glyphs. To elaborate, in some embodiments, the glyph generation system receives a partial or incomplete glyph and utilizes the partial glyph to generate a font representation code. From the font representation code corresponding to the partial glyph, in some implementations, the glyph generation system generates a completed glyph matching the style or appearance of the partial glyph. In certain cases, the glyph generation system further generates a glyph set corresponding to the partial glyph by automatically propagating the appearance of the partial glyph to generate additional glyphs via the partial-glyph font representation code.

As suggested above, embodiments of the glyph generation system provide certain improvements or advantages over conventional font editing systems. For example, embodiments of the glyph generation system improve accuracy over conventional systems. To elaborate, compared to conventional systems, embodiments of the glyph generation system more accurately generate glyphs having a particular appearance (e.g., in a particular font). As opposed to conventional systems that rely on either pixel representations or vector representations of fonts, the glyph generation system generates a first-of-its-kind font representation code that achieves semantic editability and scalability for generating glyphs. Thus, the glyph generation system prevents degradation and detail loss when scaling glyphs for improved accuracy. Additionally, compared to conventional systems, the glyph generation system more accurately replicates font resemblance across generated glyphs, thereby generating glyphs that accurately reflect visual traits of a common font.

In addition, the glyph generation system improves flexibility over conventional font editing systems. More particularly, by generating and utilizing the font representation code, the glyph generation system improves the flexibility of semantic editing compared to conventional systems. Indeed, while some conventional systems rigidly require editing each glyph independently to generate a glyph set having a common appearance, the glyph generation system more flexibly adapts the appearance of a glyph to other glyphs by utilizing font representation code to automatically propagate an initial glyph's appearance to other glyphs.

As a further advantage over conventional systems, the glyph generation system utilizes a unique machine learning architecture that includes a meta network in conjunction with a deep implicit function network. More specifically, the glyph generation system utilizes a glyph appearance propagation model that has a particular unique architecture for generating font representation codes. In some embodiments, the glyph appearance propagation model includes an encoder neural network, multiple decoder neural networks, and a SIREN network. As mentioned above, the glyph generation system learns parameters for the encoder neural network, the decoder neural networks, and the SIREN network utilizing a joint training technique. Specifically, the glyph generation system utilizes importance-aware sampling to sample long boundaries with higher probability and samples from homogeneous areas with low probability. By utilizing importance-aware sampling, the glyph generation system significantly increases training efficiency. Furthermore, the glyph generation system utilizes a weighted loss to punish more on the error accruing along boundaries to improve boundary reconstruction.

Additionally, the glyph generation system is able to perform certain functions not found in existing systems. For example, the glyph generation system generates completed glyphs from partial glyphs, which many conventional font editing systems cannot do. To elaborate, the glyph generation system utilizes the glyph appearance propagation model to generate a font representation code from a partial glyph that is missing one or more portions. From the font representation code of the partial glyph, the glyph generation system further generates completed glyphs (e.g., for a corresponding glyph set) that visually resemble an appearance of the partial glyph.

As another advantage over conventional systems, embodiments of the glyph generation system are more efficient by requiring fewer computing resources. Indeed, to make a given font viewable and usable on a given device, conventional systems often require downloading or otherwise storing large numbers of different glyph images in many different sizes for each glyph of every single font. Predictably, the computational burden becomes even greater on these prior systems as the number of fonts increases and as the resolution of the larger font sizes increases. Conversely, the glyph generation system generates a relatively small font representation code that includes all of the necessary information to view and utilize an entire font (e.g., all the glyphs of the font). Indeed, the glyph generation system requires only a single font representation code (as opposed to many different glyph images in many different resolutions for each glyph of a font) to generate every glyph in any size for a given font. Thus, the glyph generation system requires fewer computing resources in storing, transferring, and processing information for viewing and using fonts.

As suggested by the foregoing discussion, this disclosure utilizes a variety of terms to describe features and benefits of the glyph generation system. Additional detail is hereafter provided regarding the meaning of these terms as used in this disclosure. In particular, the term the term "neural network" refers to a machine learning model that can be trained and/or tuned based on inputs to determine classifications or approximate unknown functions. For example, a neural network includes a model of interconnected artificial neurons (e.g., organized in layers) that communicate and learn to approximate complex functions and generate outputs (e.g., generated digital images) based on a plurality of inputs provided to the neural network. In some cases, a neural network refers to an algorithm (or set of algorithms) that implements deep learning techniques to model high-level abstractions in data. For example, a neural network can include a convolutional neural network, a recurrent neural network (e.g., an LSTM), a graph neural network, or a generative adversarial neural network.

Along these lines, the term "encoder neural network" refers to a neural network that extracts or encodes features from a glyph label and/or a font representation code. For example, an encoder neural network analyzes or processes input data such as a glyph label and/or a font representation code to extract numerical or mathematical representations of the glyph label together with and/or separate from the font representation code. Relatedly, the term "decoder neural network" refers to a neural network that generates parameters for a SIREN network from a latent vector including one or more extracted or encoded features. For example, a decoder neural network includes layers or neurons to decode extracted features into parameters used in a SIREN network for generating a predicted glyph. Similarly, the term "SIREN network" refers to a specific deep implicit function network called a sinusoidal representation network that generates a predicted glyph from a (predicted) font representation code and a glyph label utilizing parameters from one or more decoder neural networks. For example, a SIREN network generates predicted values (e.g., pixel values or binary values) corresponding to coordinate locations indicating which pixels are background pixels and which pixels are glyph pixels within a predicted glyph. Indeed, in some cases, the glyph generation system inputs a font representation code and a set of coordinate locations into the SIREN network to predict values for those coordinate locations, thereby generating a predicted glyph. Using a SIREN network together with an encoder neural network and multiple decoder neural networks, the glyph generation system is able to semantically rasterize a target shape for accurate font generation while also providing flexible scalability.

As mentioned above, the glyph generation system utilizes a glyph appearance propagation model. As used herein, the term "glyph appearance propagation model" refers to a machine learning model that generates font representation codes and/or predicted glyphs. For example, a glyph appearance propagation model includes an encoder neural network, multiple decoder neural networks, and a SIREN network. In some cases, the glyph appearance propagation model generates a font representation code based on a template glyph and a glyph label, where the font representation code corresponds to a predicted glyph that satisfies a similarity metric in relation to the template glyph. As used herein, the term "machine learning model" refers to a computer algorithm or a collection of computer algorithms that automatically improve for a particular task through experience based on use of data. For example, a machine learning model can utilize one or more learning techniques to improve in accuracy and/or effectiveness. Example machine learning models include various types of neural networks, decision trees, support vector machines, and Bayesian networks.

As mentioned, the glyph generation system determines a glyph label for a glyph. As used herein, the term "glyph label" refers to an indication of a character represented or depicted by a glyph. For example, a glyph label refers to a vector such as a one hot vector representing a particular character (e.g., from a template glyph from which to generate a font representation code). In some embodiments, a glyph label represents a particular character portrayed or depicted by a glyph, such as a vector representation for a lowercase "a" or an uppercase "W." In some cases, the glyph generation system generates a glyph label by utilizing a text recognition model to generate or determine a glyph label for a given glyph.

As mentioned above, in some embodiments, the glyph generation system generates a font representation code for a font corresponding to a particular glyph (e.g., a user-selected glyph or a modified glyph). As used herein, the term "font representation code" refers to a generated code representing a font. For example, a font representation code refers to a numerical or vector representation of a font from among a set of known anchor fonts, representing an interpolation between known anchor fonts, and/or representing a generated font (e.g., a combination of two or more anchor fonts). In some cases, a font representation code has a size corresponding to a number of known anchor fonts (e.g., a vector of length 10,000 for 10,000 known anchor fonts) and includes indications of which of the anchor fonts contribute to a makeup of the font representation code (or the font corresponding to the font representation code). For instance, a font representation code is a vector that includes 1s for vector entries corresponding to anchor fonts that contribute to the makeup of a font for a glyph (e.g., an unknown font for the initial glyph) and 0s for vector entries corresponding to anchor fonts that do not contribute to the makeup of the font for the glyph. As another example, a font representation code includes values other than 0s and 1s for various entries, where the values indicate respective proportions or weights of corresponding anchor fonts in the makeup of the font of the initial glyph (e.g., values between one and zero). Indeed, in some embodiments, the glyph generation system generates a hybrid font representation code or a font representation code that represents a hybrid font by determining an interpolation between anchor (e.g., known or stored) fonts. For instance, the glyph generation system determines that a particular glyph has some features corresponding to a first anchor font and other features corresponding to a second anchor font (in some proportion) and generates a hybrid font representation code that represents the interpolation between the two anchor fonts for the glyph.

In one or more embodiments, the glyph generation system generates a completed glyph from a partial glyph utilizing the glyph appearance propagation model. As used herein, the term "partial glyph" refers to a representation of a glyph that is incomplete or missing one or more portions. For example, a partial glyph is missing various pixels to make the glyph appear incomplete. Conversely, a "completed glyph" refers to a glyph generated from a partial glyph and that is filled or completed utilizing the glyph appearance propagation model. For instance, a completed glyph includes generated pixels to fill or replace missing portions of a partial glyph.

Additional detail regarding the glyph generation system will now be provided with reference to the figures. For example, FIG. 1 illustrates a schematic diagram of an example system environment for implementing a glyph generation system 102 in accordance with one or more embodiments. An overview of the glyph generation system 102 is described in relation to FIG. 1. Thereafter, a more detailed description of the components and processes of the glyph generation system 102 is provided in relation to the subsequent figures. As shown, the environment includes server(s) 104, a client device 108, a database 112, and a network 114. Each of the components of the environment communicate via the network 114, and the network 114 is any suitable network over which computing devices communicate. Example networks are discussed in more detail below in relation to FIG. 12.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 12. Although FIG. 1 illustrates a single instance of the client device 108, in some embodiments, the environment includes multiple different client devices, each associated with a different user (e.g., a digital content editor). The client device 108 communicates with the server(s) 104 via the network 114. For example, the client device 108 provides information to server(s) 104 indicating client device interactions (e.g., glyph selections, glyph edits, or other input) and receives information from the server(s) 104 such as modified glyphs and completed glyph sets. Thus, in some cases, the glyph generation system 102 on the server(s) 104 provides and receives information based on client device interaction via the client device 108.

As shown in FIG. 1, the client device 108 includes a client application 110. In particular, the client application 110 is a web application, a native application installed on the client device 108 (e.g., a mobile application, a desktop application, etc.), or a cloud-based application where all or part of the functionality is performed by the server(s) 104. Based on instructions from the client application 110, the client device 108 presents or displays information to a user, including modified glyphs within glyph modification interfaces.

As illustrated in FIG. 1, the environment includes the server(s) 104. The server(s) 104 generates, tracks, stores, processes, receives, and transmits electronic data, such as indications of client device interactions, glyphs, glyph modifications, font representation codes, and glyph labels. For example, the server(s) 104 receives data from the client device 108 in the form of an indication of a client device interaction to modify a glyph. In response, the server(s) 104 transmits data to the client device 108 to cause the client device 108 to display or present a modified glyph and/or a complete glyph set including one or more additional glyphs having an appearance or style similar to that of the modified glyph.

In some embodiments, the server(s) 104 communicates with the client device 108 to transmit and/or receive data via the network 114. In some embodiments, the server(s) 104 comprises a distributed server where the server(s) 104 includes a number of server devices distributed across the network 114 and located in different physical locations. The server(s) 104 can comprise a content server, an application server, a communication server, a web-hosting server, a multidimensional server, or a machine learning server. The server(s) 104 can further access and utilize the database 112 to store and retrieve information such as a glyph appearance propagation model, along with various glyphs, fonts, font representation codes, and/or glyph labels.

As further shown in FIG. 1, the server(s) 104 also includes the glyph generation system 102 as part of a digital content editing system 106. For example, in one or more implementations, the digital content editing system 106 can store, generate, modify, edit, enhance, provide, distribute, and/or share digital content, such as fonts, glyphs, digital images, or digital videos. For example, the digital content editing system 106 provides tools for the client device 108 to, via the client application 110, modify the appearance of a glyph by changing values at one or more coordinate locations. In some implementations, the digital content editing system 106 provides a complete glyph set including glyphs that match a style of the modified glyph.

In one or more embodiments, the server(s) 104 includes all, or a portion of, the glyph generation system 102. For example, the glyph generation system 102 operates on the server(s) to generate a font representation code (e.g., via a glyph appearance propagation model) for a given glyph based on predicted glyphs corresponding to the given glyph and to generate additional glyphs to match the appearance of the given glyph.

In certain cases, the client device 108 includes all or part of the glyph generation system 102. For example, the client device 108 can generate, obtain (e.g., download), or utilize one or more aspects of the glyph generation system 102, such as a glyph appearance propagation model from the server(s) 104. Indeed, in some implementations, as illustrated in FIG. 1, the glyph generation system 102 is located in whole or in part of the client device 108. For example, the glyph generation system 102 includes a web hosting application that allows the client device 108 to interact with the server(s) 104. To illustrate, in one or more implementations, the client device 108 accesses a web page supported and/or hosted by the server(s) 104.

Although FIG. 1 illustrates a particular arrangement of the environment, in some embodiments, the environment has a different arrangement of components and/or may have a different number or set of components altogether. For instance, as mentioned, the glyph generation system 102 is implemented by (e.g., located entirely or in part on) the client device 108. In addition, in one or more embodiments, the client device 108 communicates directly with the glyph generation system 102, bypassing the network 114. Further, in some embodiments, the environment includes a glyph appearance propagation model stored in the database 112, maintained by the server(s) 104, the client device 108, or a third-party device.

Figure 2:
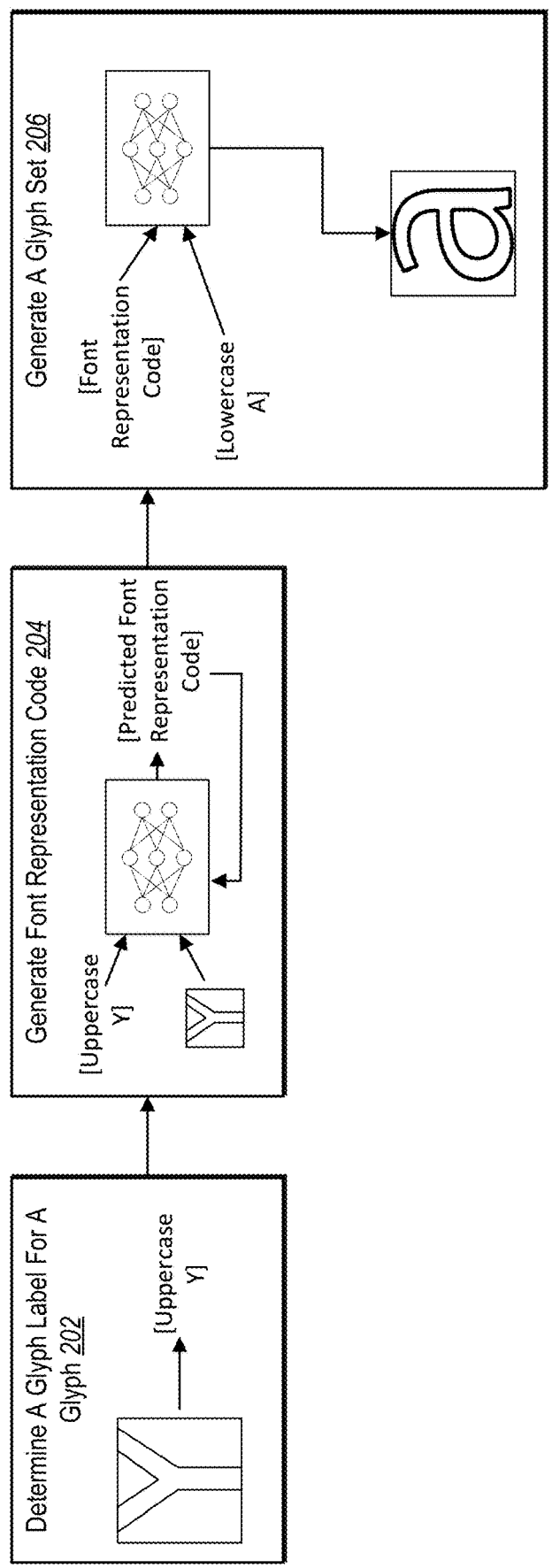
FIG. 2 illustrates an overview of generating a font representation code and a corresponding glyph set utilizing a glyph appearance propagation model in accordance with one or more embodiments.

As mentioned, in one or more embodiments, the glyph generation system 102 generates a glyph set to resemble an appearance of an initial template glyph. In particular, the glyph generation system 102 generates a font representation code for a font corresponding to an initial glyph and further generates additional glyphs for a glyph set utilizing the font representation code. FIG. 2 illustrates an example sequence of acts 202-206 for generating a glyph set based on a font representation code in accordance with one or more embodiments.

As illustrated in FIG. 2, the glyph generation system 102 performs an act 202 to determine a glyph label for a glyph. In particular, the glyph generation system 102 determines a glyph label from a particular representation of a glyph (e.g., a glyph image). For instance, the glyph generation system 102 normalizes a depiction of a glyph to have particular dimensions (e.g., a [-1, 1] square) and determines a glyph label from the normalized glyph. In some cases, the glyph generation system 102 determines the glyph label without necessarily normalizing the glyph beforehand.

In some embodiments, the glyph generation system 102 determines the glyph label utilizing a text recognition model. More specifically, the glyph generation system 102 utilizes a text recognition model trained to determine (or otherwise capable of determining) a character designation from a depiction of a glyph. For example, the glyph generation system 102 utilizes a text recognition model to identify a particular glyph as a "lowercase 'a'" or an "uppercase 'W'." In one or more implementations, the glyph generation system 102 generates a glyph label in the form of a one hot vector that indicates the depicted character. For instance, the glyph generation system 102 generates a one hot vector of size 52 for each case-sensitive letter of the English alphabet (e.g., where a 1 in a given vector location indicates the depicted character of a glyph). In one or more embodiments, the text recognition model comprises an optical character recognition (OCR) based model.

In certain embodiments, the glyph generation system 102 determines a glyph label without a text recognition model. Rather than utilize a text recognition model, in certain implementations, the glyph generation system 102 determines the glyph label from the client device 108. For instance, the glyph generation system 102 receives an indication of the glyph label via user interaction with the client device 108 (e.g., where a user designates the glyph label via the client application 110). As illustrated in FIG. 2, the glyph generation system 102 determines (e.g., via client device interaction or utilizing a text recognition model) the glyph label for the depicted glyph as an uppercase "Y."

As further illustrated in FIG. 2, the glyph generation system 102 performs an act 204 to generate a font representation code. In particular, the glyph generation system 102 generates a font representation code from the determined glyph label and corresponding glyph image utilizing a glyph appearance propagation model. In some embodiments, the glyph generation system 102 generates a font representation code utilizing an iterative process that repeats until a stopping criterion is met. For instance, the glyph generation system 102 utilizes the glyph appearance propagation model to, at each iteration for a number of iterations, generate a predicted font representation code and a corresponding predicted glyph image. Indeed, the glyph generation system 102 utilizes the glyph appearance propagation model to predict a font representation code from the glyph label together with the glyph image. For example, the glyph appearance propagation model generates a prediction of a font representation code for a font that would result in a glyph that has a particular glyph label (e.g., an uppercase "Y") also having the appearance of the initial glyph.

To test the predicted font representation code at each iteration, the glyph generation system 102 generates a predicted glyph image from each predicted font representation code and glyph label combination. The glyph generation system 102 compares, at each iteration, the predicted glyph image with the initial glyph image. The glyph generation system 102 backpropagates a loss based on the comparison to update the font representation code. Over multiple iterations, the glyph generation system 102 repeats this process to determine a font representation code that results in a predicted glyph that satisfies a similarity metric with respect to the initial glyph image. Additional detail regarding generating the font representation code is provided below with reference to subsequent figures.

As further illustrated in FIG. 2, the glyph generation system 102 optionally also performs an act 206 to generate a glyph set. More particularly, the glyph generation system 102 generates additional glyphs to resemble an appearance of the initial glyph utilizing the generating font representation code (e.g., generated via the act 204). For example, the glyph generation system 102 utilizes the glyph appearance propagation model to generate a glyph set by generating glyphs from respective glyph labels based on the font representation code. Specifically, the glyph generation system 102 generates a glyph for a lowercase "a" in the same style as the initial uppercase "Y" input into the glyph appearance propagation model initially. The glyph generation system 102 likewise generates other glyphs from respective glyph labels as well.

Figure 3:
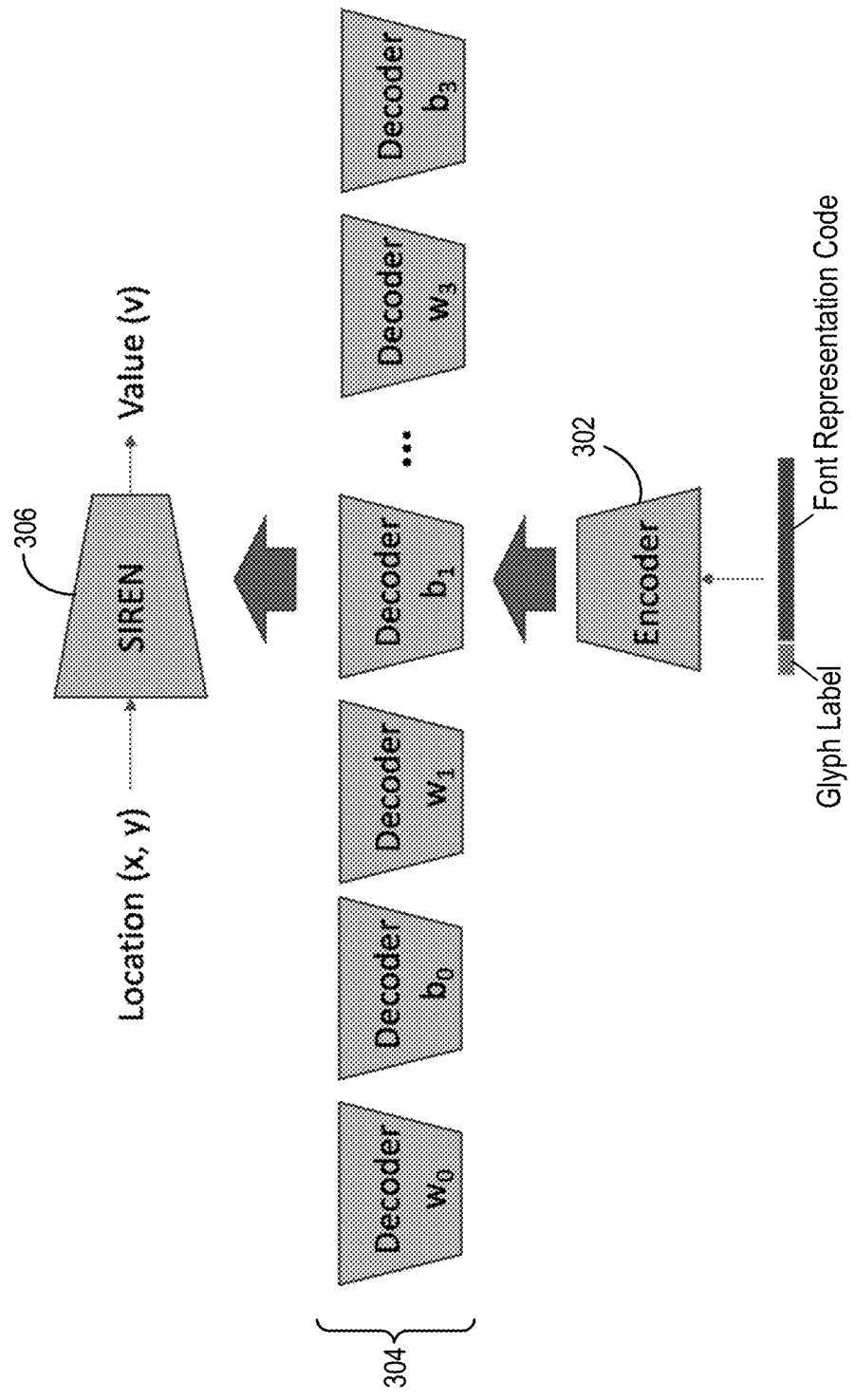
FIG. 3 illustrates an example architecture of a glyph appearance propagation model in accordance with one or more embodiments.

As mentioned above, in certain described embodiments, the glyph generation system 102 utilizes a glyph appearance propagation model that has a particular structure or architecture. In particular, the glyph appearance propagation model includes an encoder neural network, multiple decoder neural networks, and a SIREN network. FIG. 3 illustrates an example architecture of the glyph appearance propagation model in accordance with one or more embodiments.

As illustrated in FIG. 3, the glyph appearance propagation model includes an encoder neural network 302. In particular, the encoder neural network 302 extracts or encodes features from a glyph label and a font representation code. For example, the encoder neural network 302 is a multi-layer perceptron which concatenates the glyph label and the font representation code as input and extracts or encodes a latent vector representing a high-level feature carrying glyph and font information. In some embodiments, the encoder neural network 302 has a structure including a number of neurons based on a number of anchor fonts. For instance, the encoder neural network 302 includes 10,000+52 neurons in a first layer (corresponding to 10,000 anchor fonts and 52 distinct glyphs in the English alphabet), followed by 4,000 neurons in a second layer, 1,000 neurons in a third layer, 500 neurons in a fourth layer, and 256 neurons in a final (e.g., output) layer.

Additionally, the glyph appearance propagation model includes multiple decoder neural networks 304. In particular, the decoder neural networks 304 are multi-layer perceptrons that, given the latent vector from the encoder neural network 302, predict parameters for the SIREN network 306. For example, the decoder neural networks 304 generate or predict parameters such as weights ($w_i$) and biases ($b_i$) used in the SIREN network 306 for generating a predicted glyph, where i represents the layer index. Thus, the decoder neural networks 304 generate parameters for each layer of the SIREN network 306, one for weight and one for bias. In some embodiments, the decoder neural networks 304 each have a particular architecture including 256 neurons in a first layer (e.g., corresponding to the number of layers in the final layer of the encoder neural network 302), 256 neurons in a second layer, 256 neurons in a third layer, and a number of neurons in a final layer depending on (e.g., matching) a number of parameters (e.g., weights and biases) required by the SIREN network 306.

As further illustrated in FIG. 3, the glyph appearance propagation model includes a SIREN network 306. More specifically, the SIREN network 306 is a multi-layer perceptron that will generate different glyphs based on different parameters. Indeed, the SIREN network 306 generates a glyph utilizing predicted parameters from the decoder neural networks 304 and thereby generates different glyphs for different predicted parameters at respective iterations. In some cases, the SIREN network 306 generates a predicted glyph by predicting values for respective (x, y) coordinate locations within a normalized [−1, 1] square. For instance, the SIREN network 306 predicts a value of 0 or 1 for each of the coordinate locations, where a location corresponding to a glyph surface is 1 and a location not corresponding to a glyph surface is 0 (or vice-versa). In some embodiments, the SIREN network 306 has a particular architecture including 2 neurons in a first layer, 128 neurons in a second layer, 128 neurons in a third layer, 128 neurons in a fourth layer, and 1 neuron in a final (e.g., output) layer that corresponds to a predicted value for a given coordinate location. In certain implementations, the SIREN network 306 is as described by Vincent Sitzmann, Julien N. P. Martel, Alexander W. Bergman, David B. Lindell, and Gordon Wetzstein in *Implicit Neural Representations with Periodic Activation Functions*, arXiv:2006.0966v1 (Jun. 17, 2020), which is incorporated by reference herein in its entirety.

Figure 4:
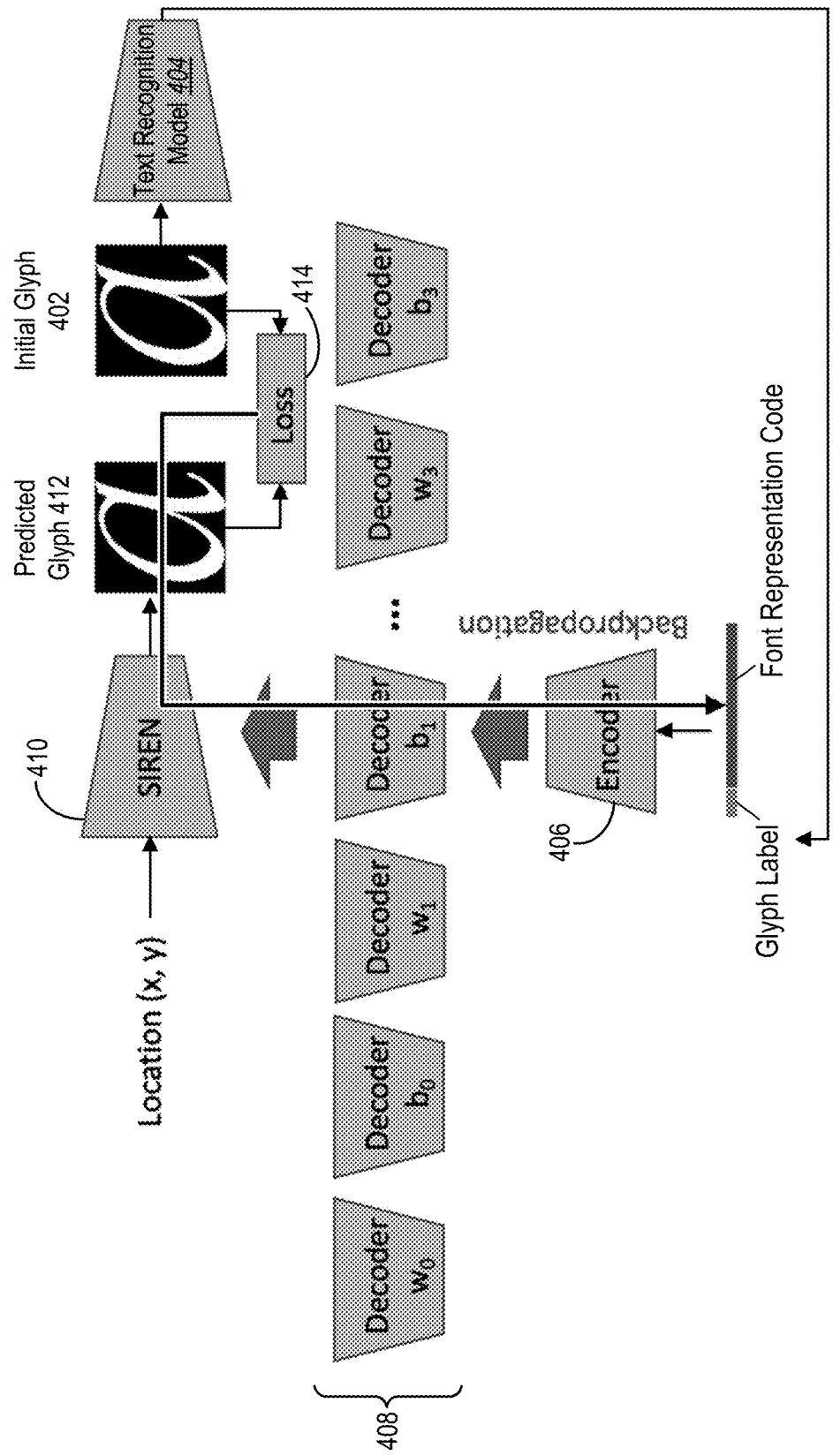
FIG. 4 illustrates an example iterative process of generating a font representation code in accordance with one or more embodiments.

As mentioned above, in certain embodiments, the glyph generation system 102 utilizes a glyph appearance propagation model to generate a font representation code based on predicted glyphs. In particular, the glyph generation system 102 utilizes an iterative process to generate a font representation code for a font corresponding to a glyph based on generating iterative versions of predicted glyphs. FIG. 4 illustrates an example process of generating a font representation code utilizing a glyph appearance propagation model in accordance with one or more embodiments.

As illustrated in FIG. 4, the glyph generation system 102 identifies or receives an initial glyph 402 (e.g., a glyph image). For example, the glyph generation system 102 receives a user selection of the initial glyph 402 from the client device 108. In one or more embodiments, the glyph generation system 102 normalizes the initial glyph 402 to a [−1, 1] square for subsequent steps.

As shown, the glyph generation system 102 determines a glyph label from the initial glyph 402 utilizing a text recognition model 404. More specifically, the glyph generation system 102 inputs the initial glyph 402 into the text recognition model 404 which, in turn, generates a glyph label indicating that the glyph depicts a lowercase "a." For instance, the text recognition model 404 is a machine learning model such as a neural network trained to recognize characters in images. In some cases, the text recognition model 404 generates the glyph label in the form of a one hot vector indicating the character that is depicted (e.g., the lowercase "a").

As further shown, the glyph generation system 102 utilizes the glyph label together with a font representation code. Indeed, the glyph generation system 102 utilizes the encoder neural network 406 (e.g., the encoder neural network 302) of the glyph appearance propagation model to generate a latent glyph vector from the glyph label and the font representation code. For example, the glyph generation system 102 concatenates the glyph label with an initial font representation code for an initial iteration. In some cases, the glyph generation system 102 initializes the font representation code for the first iteration at an initial value (e.g., by random sampling from a normal distribution with a mean of 0 and a standard deviation of 0.001). Indeed, in some embodiments, the font representation code is a one hot vector with a length of 10,000 to represent 10,000 different anchor fonts. In other embodiments, the font representation code has a different length for a different number of anchor fonts.

In these or other embodiments, the glyph generation system 102 interpolates between the anchor fonts to generate or determine hybrid fonts that are amalgamations or combinations of multiple anchor fonts (in some proportions). For example, the glyph generation system 102 interpolates between two known anchor fonts to generate a font representation code that has some visual traits of one anchor font and other visual traits of another anchor font (e.g., for a font that is halfway between the anchor fonts). As another example, the glyph generation system 102 interpolates between anchor fonts in different portions to generate a font representation code that represents a font that is 80% of a first anchor font and 20% of a second anchor font (e.g., utilizing proportional weighting of features of the fonts).

In certain implementations, the glyph generation system 102 generates a new font (e.g., a font not included in a set of anchor fonts) from a font representation code. For example, the glyph generation system 102 generates a font representation code including values at particular entries corresponding to respective anchor fonts. In some cases, the font representation code includes 0s and 1s at the different entries, where 1s indicate anchor fonts that contribute to the font of the initial glyph. In other cases, the font representation code includes values between 0 and 1 (e.g., 0.3, or 0.7) for entries corresponding to respective anchor fonts, where the various entry values represent contribution weights or contribution measures for the respective anchor fonts. Thus, in some embodiments, the glyph generation system 102 combines the values of the entries in the font representation code to determine a font (e.g., by combining the anchor fonts according to their indicated contribution weights) for the initial glyph. In certain implementations, the glyph generation system 102 further modifies the font representation code (e.g., by modifying one or more of the entry values for the anchor fonts) to generate a new font.

In one or more embodiments, the glyph generation system 102 combines (e.g., concatenates) the glyph label with the font representation code. From the (concatenated) glyph label and font representation code, the encoder neural network 406 extracts or encodes a latent vector for passing to the decoder neural networks 408 (e.g., the decoder neural networks 304). In turn, the decoder neural networks 408 share the latent vector among them to generate parameters (e.g., weights and biases) for the SIREN network 410 (e.g., the SIREN network 306). In addition, the SIREN network 410 generates a predicted glyph 412 by generating predicted values at each coordinate location (x, y) of a [−1, 1] square in accordance with the parameters generated via the decoder neural networks 408.

As mentioned, the SIREN network 410 generates predicted values such as a 0 for locations that do not correspond to a glyph surface and a 1 for locations that do respond to a glyph surface. In some embodiments, the SIREN network 410 generates predicted values that are not exactly 0 or 1, but that fall somewhere in between. Indeed, the SIREN network 410 can generate a probability (e.g., between 0 and 1) of a location representing a glyph surface, where number closer to 1 indicate higher probabilities of the location representing a glyph surface. In one or more implementations, the glyph generation system 102 utilizes a predicted value threshold, where predicted values above the threshold are assigned a value of 1 and predicted values below the threshold are assigned a value of 0. For example, if the SIREN network 410 predicts a value of 0.85 and the threshold is set at 0.7, then the glyph generation system 102 assigns a value of 1 for the predicted value. If, on the other hand, the SIREN network 410 predicts a value of 0.4 (where the threshold is at 0.7), then the glyph generation system 102 assigns a value of 0 for the predicted value.

As further illustrated in FIG. 4, the glyph generation system 102 compares the predicted glyph 412 with the initial glyph 402. For example, the glyph generation system 102 utilizes a loss function 414 to compare the predicted glyph 412 and the initial glyph 402. In one or more embodiments, the glyph generation system 102 utilizes an L1 loss function (or some other loss function such as a cross-entropy loss function) to determine a loss or a distance between the predicted glyph 412 and the initial glyph 402. Based on the loss (or the distance), the glyph generation system 102 back propagates to modify the font representation code (and/or parameters of the encoder neural network 406 or the decoder neural networks 408) for generating new predictions on the next iteration.

Indeed, the glyph generation system 102 repeats the process illustrated in FIG. 4 for multiple iterations. More particularly, the glyph generation system 102 repeats the process of: i) concatenating the modified font representation code with the glyph label, ii) encoding a latent vector from the glyph label and the font representation code utilizing the encoder neural network 406, iii) determining iteration-specific parameters (e.g., weights and biases) from the latent vector utilizing the decoder neural networks 408, iv) generating a predicted glyph based on the iteration-specific parameters (e.g., by predicting values for different locations), v) comparing the predicted glyph with the initial glyph utilizing a loss function, and iv) back propagating to modify the font representation code for the next iteration.

In one or more implementations, the glyph generation system 102 repeats the aforementioned process for a threshold number of iterations and/or until a predicted glyph of a most recent iteration satisfies a similarity metric. For instance, the glyph generation system 102 determines that a predicted glyph satisfies a threshold loss or a threshold distance in relation to the initial glyph 402. In response to this determination, the glyph generation system 102 selects the font representation code from which the predicted glyph is generated (e.g., from the same iteration) as the font representation code for the initial glyph 402. As described in further detail below, the glyph generation system 102 further utilizes the selected font representation code to generate additional glyphs to, for example, generate a complete glyph set in the font of the initial glyph 402.

In some cases, the glyph generation system 102 receives an indication of a modification to the initial glyph 402 via the client device 108. In response to the modification, the glyph generation system 102 determines an updated glyph label utilizing the text recognition model 404. In addition, the glyph generation system 102 generates an updated font representation code utilizing the glyph appearance propagation model (e.g., via the aforementioned iterative process). Further, the glyph generation system 102 generates updated glyphs for a modified glyph set from the updated font representation code (and respective glyph labels) and corresponding to the modified glyph.

In one or more embodiments, the glyph generation system 102 performs a step for generating a font representation code for a font corresponding to the glyph. The above description of FIGS. 3-4, particularly the description of the acts involved in generating a font representation code as described in relation to FIG. 4, provide various embodiments and supporting acts and algorithms for performing a step for generating a font representation code for a font corresponding to the glyph in accordance with this description.

Figure 5:
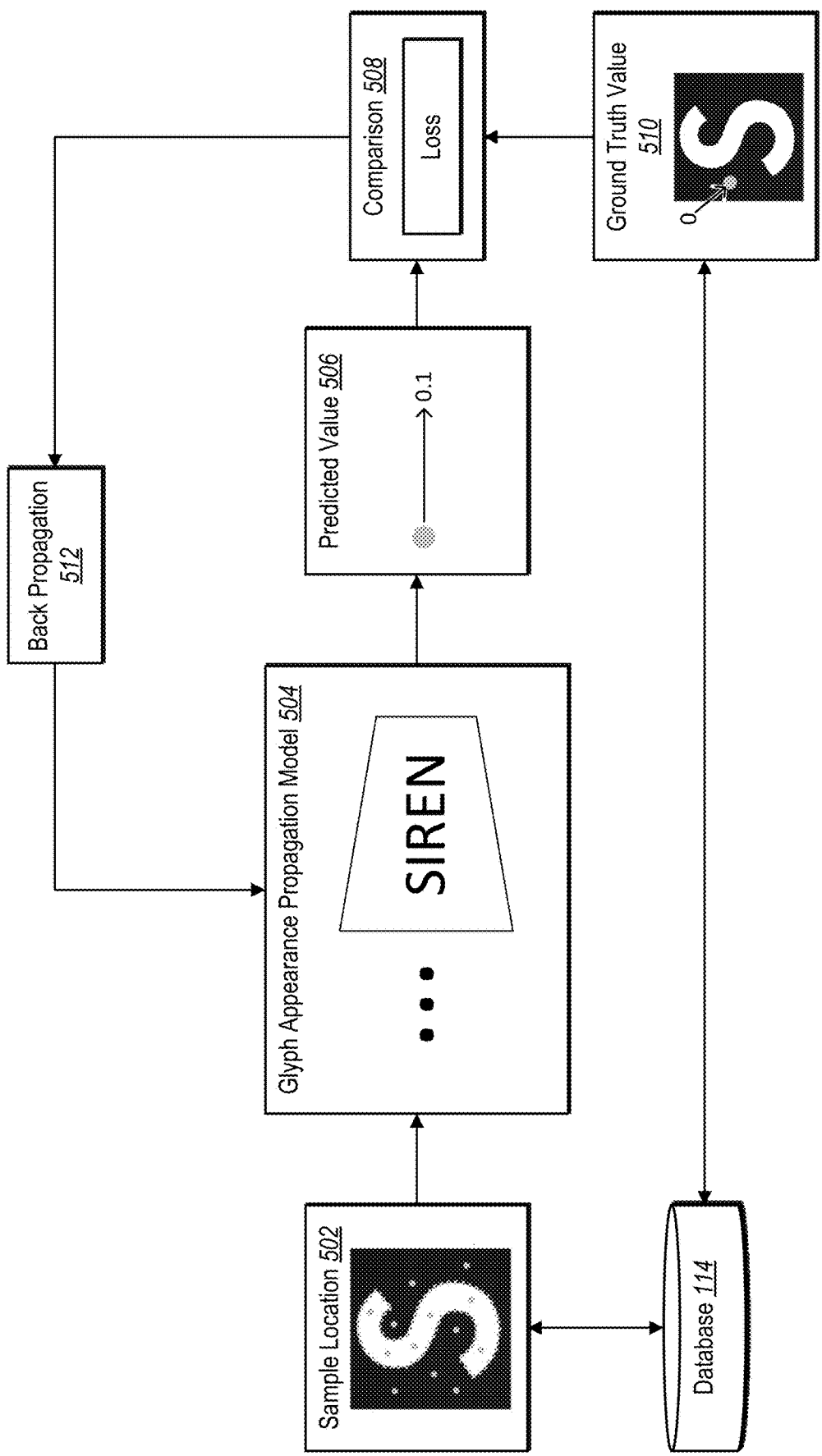
FIG. 5 illustrates an example training process for a glyph appearance propagation model in accordance with one or more embodiments.

As mentioned above, in certain described embodiments, the glyph generation system 102 learns parameters for the glyph appearance propagation model through a training or tuning process. In particular, the glyph generation system 102 learns parameters for a SIREN network (e.g., the SIREN network 410 or 306) for generating glyph images. FIG. 5 illustrates an example process for training a glyph appearance propagation model 504 in accordance with one or more embodiments.

As illustrated in FIG. 5, the glyph generation system 102 accesses or identifies training data such as sample locations (e.g., (x, y) coordinate locations) and ground truth values (e.g., 0s and 1s indicating glyph surface locations or non-glyph-surface locations) corresponding to the sample locations. In particular, the glyph generation system 102 utilizes two-dimensional training samples in the form of glyph images and normalizes the glyph images to [−1, 1] squares for training. In addition, the glyph generation system 102 inputs the pixel locations into the glyph appearance propagation model 504 to generate predicted values.

More specifically, the glyph generation system 102 determines a sample location 502 from a glyph image stored within the database 112. For example, the glyph generation system 102 determines the sample location by sampling a glyph image using an importance-aware sampling technique. To elaborate, the glyph generation system 102 increases training efficiency (especially over a large glyph scale) by performing importance-aware sampling to reduce the overall number of location points used in training while still preserving detailed structure of a glyph. Indeed, the glyph generation system 102 samples more locations in a higher density along boundaries and corners of a glyph and samples fewer location in a sparser density in background areas (not along boundaries or on the surface) of a glyph. As shown, the glyph for the uppercase "S" indicates sparser sampling in the black background region and the white surface region (as indicated by the circles) and denser sampling along the boundary of the "S," as indicated by the dashed lines bordering the "S" shape.

Based on this importance-aware sampling, the glyph generation system 102 selects a sample location 502 from a background area, a glyph surface, or along a boundary of a glyph. In addition, the glyph generation system 102 inputs the sample location 502 into the glyph appearance propagation model 504 (e.g., into the SIREN network of the glyph appearance propagation model 504), whereupon the glyph appearance propagation model 504 (e.g., the SIREN network) generates a predicted value 506 for the sample location 502 (e.g., a predicted value of 0.1 for a background sample location). Indeed, the glyph appearance propagation model 504 predicts a value that corresponds to the sample location 502, indicating whether the sample location 502 is predicted as part of a glyph or not part of a glyph.

As further illustrated in FIG. 5, the glyph generation system 102 performs a comparison 508 to compare the predicted value 506 with a ground truth value 510. Particularly, the glyph generation system 102 accesses the ground truth value 510 from the database 112, where ground truth value 510 corresponds to, and indicates the actual value or the true value of, the sample location 502. Thus, the glyph generation system 102 performs the comparison 508 utilizing a loss function to determine a measure of loss (or a distance) between the predicted value 506 and the ground truth value 510. For example, the glyph generation system 102 utilizes a particular loss function such as a weighted loss given by:

$$L(\hat{v},v)=\|W \times (\hat{v}-v)\|_1$$

where $\hat{v}$ represents the predicted value 506, v represents the ground truth value 510, L represents a loss function, and W represents the weights obtained from an importance map for guiding the importance-aware sampling.

Indeed, in some implementations, the glyph generation system 102 generates or predicts the importance map utilizing an autoencoder pretrained on sample glyph images from the database 112. For example, the glyph generation system 102 generates the importance map in accordance with the following equation:

$$W=\|AE(I)-I\|$$

where W represents the weights of the importance map, AE represents an autoencoder, and I represents a sample glyph image. In some cases, the importance map also guides the dense sampling for identifying sample locations for training. In addition, the glyph generation system 102 performs a back propagation 512 to modify weights, biases, and/or other parameters of the glyph appearance propagation model 504 (e.g., of the encoder neural network, the decoder neural networks, and/or the SIREN network) to adjust how the glyph appearance propagation model 504 process, analyzes, and passes data.

In some embodiments, the glyph generation system 102 repeats the process illustrated in FIG. 5 for a number of iterations or epochs. In particular, across the multiple iterations, the glyph generation system 102 identifies sample locations, utilizes the glyph appearance propagation model 504 (or the SIREN network) to generate predicted values at the sample locations, compares the predicted values with ground truth values for the sample locations, and back propagates to modify parameters. Thus, with each successive iteration, the glyph appearance propagation model 504 (or the SIREN network) changes how it generates predicted values until the glyph appearance propagation model 504 satisfies a threshold accuracy and/or until a predicted value satisfies a threshold measure of loss in relation to a corresponding ground truth value.

Figure 6:
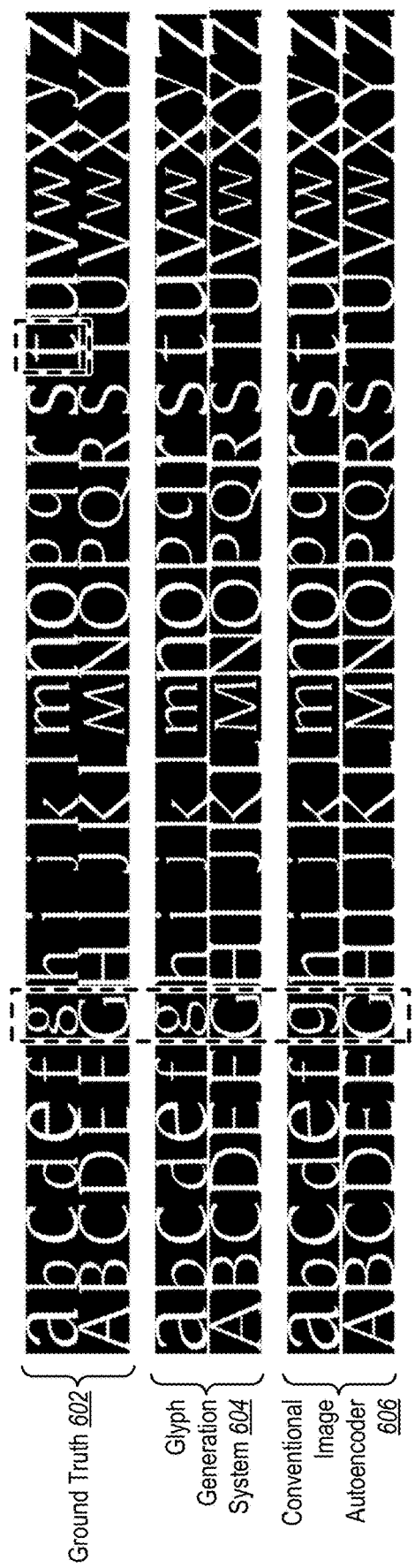
FIG. 6 illustrates an example comparison of glyph sets in accordance with one or more embodiments.

As mentioned above, in certain described embodiments, the glyph generation system 102 generates a glyph set in a font matching the font of an initial glyph. In particular, the glyph generation system 102 generates additional glyphs for respective glyph labels based on a generated font representation code corresponding to a font of the initial glyph. For instance, the glyph generation system 102 fixes the font representation code and iterates through different glyph labels to generate a glyph set resembling the appearance of the initial glyph. FIG. 6 illustrates a comparison of a glyph set 604 generated the glyph generation system 102 against a ground truth glyph set 602 and a glyph set 606 generated by a conventional image autoencoder.

As illustrated in FIG. 6, the glyph generation system 102 generates the glyph set 604 based on the initial glyph "t" from the ground truth glyph set 602 (as indicated by the dashed box). As described herein, the glyph generation system 102 generates the glyph set 604 by first generating a font representation code from the initial glyph "t." Specifically, the glyph generation system 102 determines a glyph label for the initial glyph "t" utilizing a text recognition model. In addition, the glyph generation system 102 utilizes a glyph appearance propagation model to determine a font representation code for the initial glyph "t." Further, the glyph generation system 102 fixes the font representation code and iterates through different glyph labels (e.g., 52 glyph labels for a complete English alphabet glyph set) utilizing the glyph appearance propagation model to generate additional glyphs to fill out the glyph set 604. Thus, the glyph generation system 102 generates the glyph set 604 in a font that matches the font of the initial glyph "t."

Comparing the glyph set 604 to the ground truth glyph set 602, the individual glyphs within the glyph set 604 accurately resemble the corresponding glyphs within the ground truth glyph set 602. Indeed, the glyph set 604 generated by the glyph generation system 102 more closely resembles the ground truth glyph set 602 than does the glyph set 606 generated by a conventional autoencoder. Looking at the lowercase "g" glyphs across the three sets specifically, the ground truth "g" and the "g" generated by the glyph generation system 102 are quite similar, whereas the "g" generated by the conventional autoencoder does not share many visual traits with the ground truth. Compared to existing systems, the glyph generation system 102 generates more accurate glyphs utilizing the glyph appearance propagation model described herein.

Figure 7:
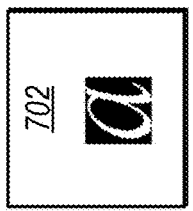
FIG. 7 illustrates an example of scaling a glyph in accordance with one or more embodiments.
Figure 7:
Figure 7:
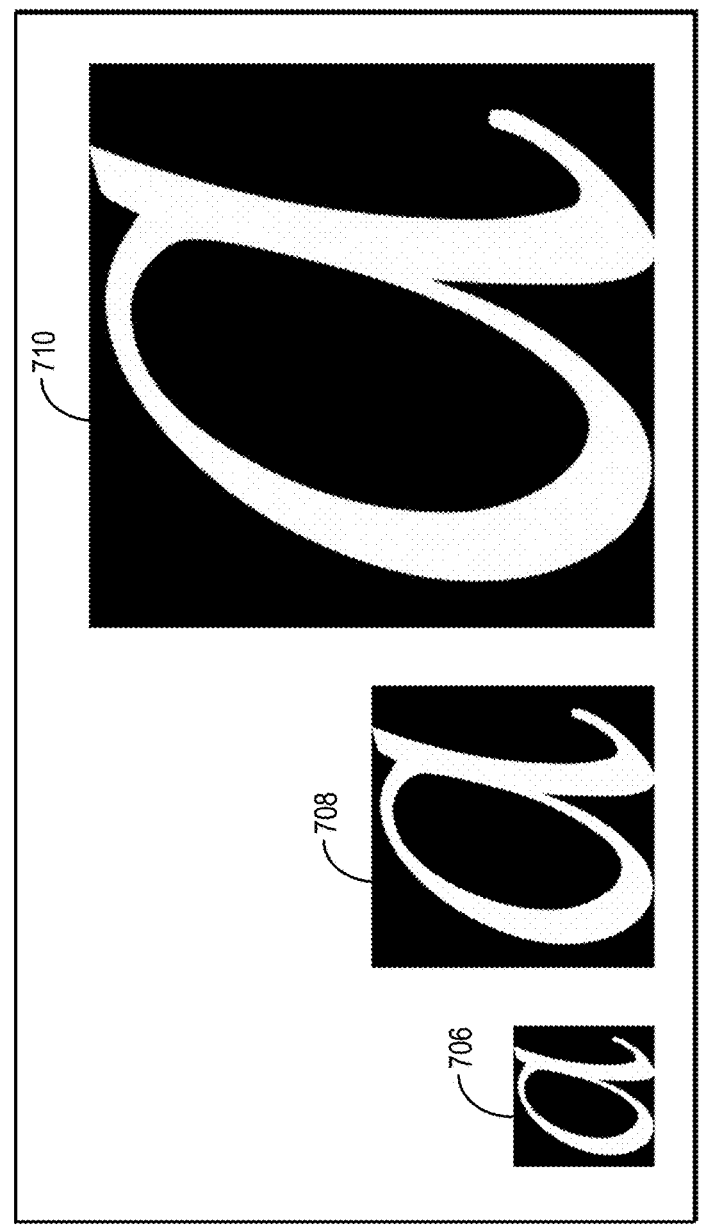

As mentioned above, in certain described embodiments, the glyph generation system 102 scales glyphs without losing detail or degrading appearance. In particular, the glyph generation system 102 utilizes the glyph appearance propagation model to generate glyphs in different (e.g., larger or smaller) scales without degrading the appearance of the glyphs. FIG. 7 illustrates an example set of scaled glyphs generated by the glyph generation system 102 in accordance with one or more embodiments.

As illustrated in FIG. 7, the glyph 702 is the original glyph, while the glyph 704 is a 2× upscaled glyph generated from a conventional pixel-representation-based system, and glyphs 706-710 are different upscaled glyphs (e.g., 2×, 4×, and 8×, respectively) generated by the glyph generation system 102 described herein. As shown, the glyph 704 appears degraded somewhat with pixilation or jagged edges around the boundary of the glyph, whereas the glyph generation system 102 generates the glyphs 706-710 with clear details. Indeed, even at 4× (for the glyph 708) or 8× upscaling (for the glyph 710), the glyph generation system 102 generates clear glyph images without degrading appearance, while the conventional pixel-based system already degrades the glyph at a 2× upscaling (e.g., the glyph 704).

To generate the glyphs 706-710, the glyph generation system 102 utilizes the adaptive sampling technique described above to train a glyph appearance propagation model. Particularly, the glyph generation system 102 utilizes a weighted loss to penalize areas in the background of a glyph image for sparser background sampling while focusing denser sampling along a boundary of a glyph surface. Based on the dense sampling along the boundary of the glyph, the glyph generation system 102 is able to upscale to arbitrary scales.

For example, the glyph generation system 102 samples an arbitrarily sized grid (e.g., 1000×1000 samples or 2000×2000 samples) from a normalized [−1, 1] glyph image. Based on the dimensions or density of the sampling, the glyph generation system 102 is able to reconstruct a glyph image of a corresponding size. For instance, if the glyph generation system 102 samples a grid of 1000×1000 samples, then the glyph generation system 102 can generate a glyph image of up to 1000×1000 pixels. Thus, the glyph generation system 102 is able to upscale a glyph without losing details by sampling a normalized glyph image at a density that allows for reconstructing an upscaled glyph image of the required size.

Figure 8:
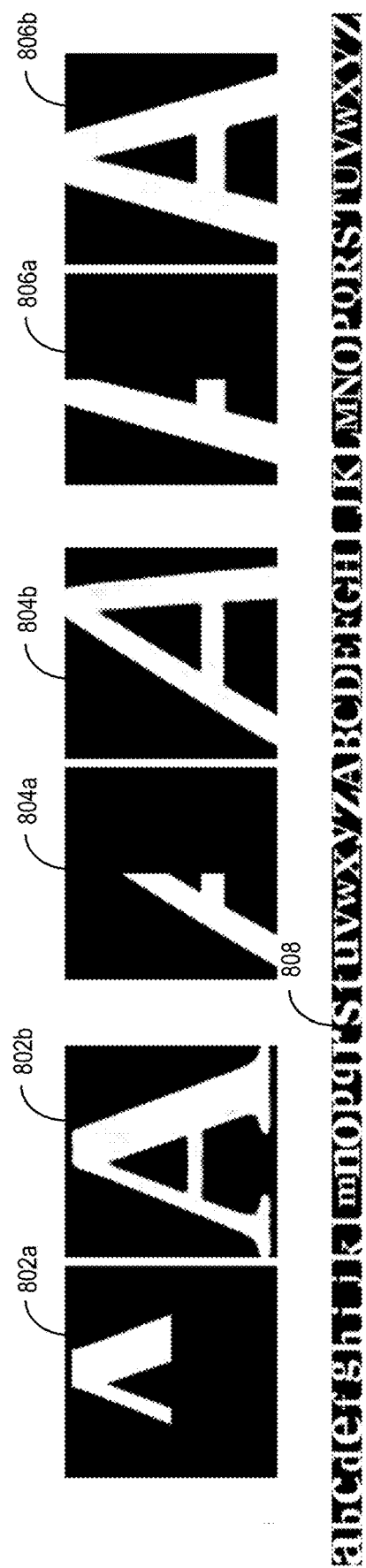
FIG. 8 illustrates examples of generating completed glyphs from partial glyphs in accordance with one or more embodiments.

As mentioned above, in certain described embodiments, the glyph generation system 102 generates completed glyphs from partial glyphs. In particular, the glyph generation system 102 generates a completed glyph from an initial partial glyph that is complete or missing one or more portions, which many conventional systems cannot do. FIG. 8 illustrates example completed glyphs generated from partial glyphs utilizing the glyph appearance propagation model in accordance with one or more embodiments.

As illustrated in FIG. 8, the glyph generation system 102 generates the completed glyph 802b from the partial glyph 802a. To elaborate, the glyph generation system 102 determines or receives a glyph label for the partial glyph (e.g., from the client device 108 or via a text recognition model) and utilizes the glyph appearance propagation model to generate a font representation code from the glyph label. Indeed, as described, the glyph generation system 102 utilizes the glyph appearance propagation model to iteratively generate predicted (partial) glyphs from iterative versions of a font representation code until a predicted (partial) glyph satisfies a similarity metric in relation to the initial partial glyph. The glyph generation system 102 thus selects the font representation code that corresponds to the predicted (partial) glyph that satisfies the similarity metric. From the selected font representation code and a given (completed) glyph label, the glyph generation system 102 generates the completed glyph 802b.

Likewise, the glyph generation system 102 generates the completed glyph 804b from the partial glyph 804a and the completed glyph 806b from the partial glyph 806a in a similar fashion. Indeed, the glyph generation system 102 generates the completed glyph 804b from a font representation code corresponding to the partial glyph 804a and generates the completed glyph 806b from a font representation code corresponding to the partial glyph 806a. As shown, the completed glyph 804b visually resembles the appearance of the partial glyph 804a, while the completed glyph 806b visually resembles the appearance of the partial glyph 806a.

As further illustrated in FIG. 8, the glyph generation system 102 also generates a glyph set 808 based on a partial glyph. For example, the glyph generation system 102 utilizes the glyph appearance propagation model to generate the glyph set 808 from the partial glyph 802a. More specifically, as described above, the glyph generation system 102 fixes the font representation code generated from the partial glyph 802a and iterates through glyph labels to generate the glyph set 808.

Figure 9:
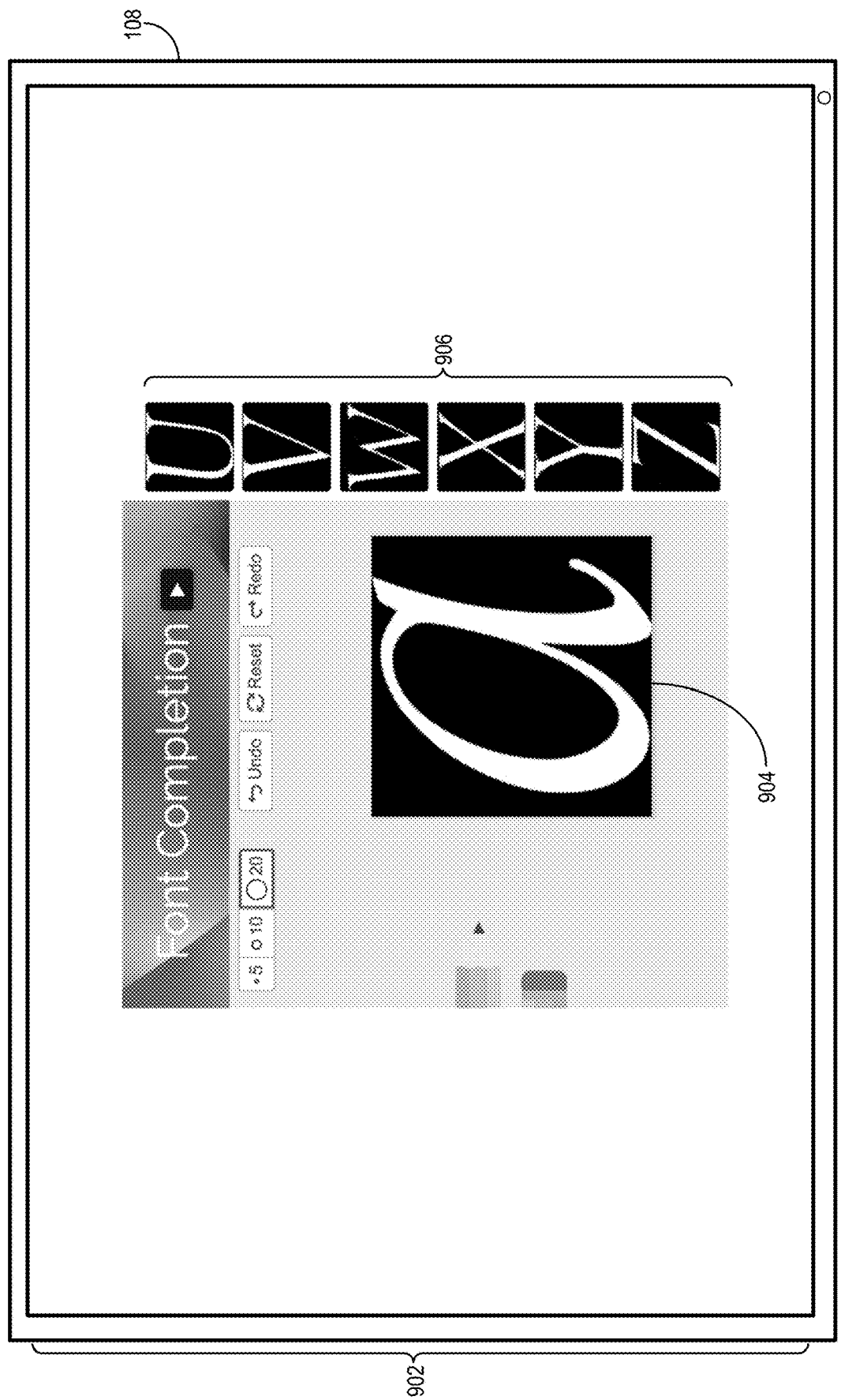
FIG. 9 illustrates an example glyph modification interface in accordance with one or more embodiments.

As mentioned, in certain described embodiments, the glyph generation system 102 provides a glyph modification interface for display on the client device 108. In particular, the glyph generation system 102 generates and provides a glyph modification interface for presenting and modifying glyphs. FIG. 9 illustrates the client device 108 displaying a glyph modification interface 902 in accordance with one or more embodiments.

As illustrated in FIG. 9, the glyph modification interface 902 includes a depiction of a user-selected glyph 904 together with a glyph set 906 generated from the user-selected glyph 904. Indeed, the glyph generation system 102 receives a selection or an upload of the glyph 904. In some cases, the glyph generation system 102 receives one or more modifications to the glyph 904 as well. In certain embodiments, the glyph generation system 102 provides selectable tools or options for editing, modifying, or manipulating the glyph 904 (e.g., by resizing, modifying pixels, or otherwise changing its appearance). In addition, the glyph generation system 102 generates the glyph set 906 from the glyph 904 by utilizing a glyph appearance propagation model.

For instance, the glyph generation system 102 determines a glyph label for the glyph 904, generates a font representation code based on the glyph label (e.g., utilizing the iterative process described herein), and generates additional glyphs for the glyph set 906 by fixing the font representation code and iterating through different glyph labels. As shown in FIG. 9, the glyphs in the glyph set 906 share a common style or appearance, and they resemble the style of the glyph 904, despite being uppercase characters while the glyph 904 depicts a lowercase character.

Figure 10:
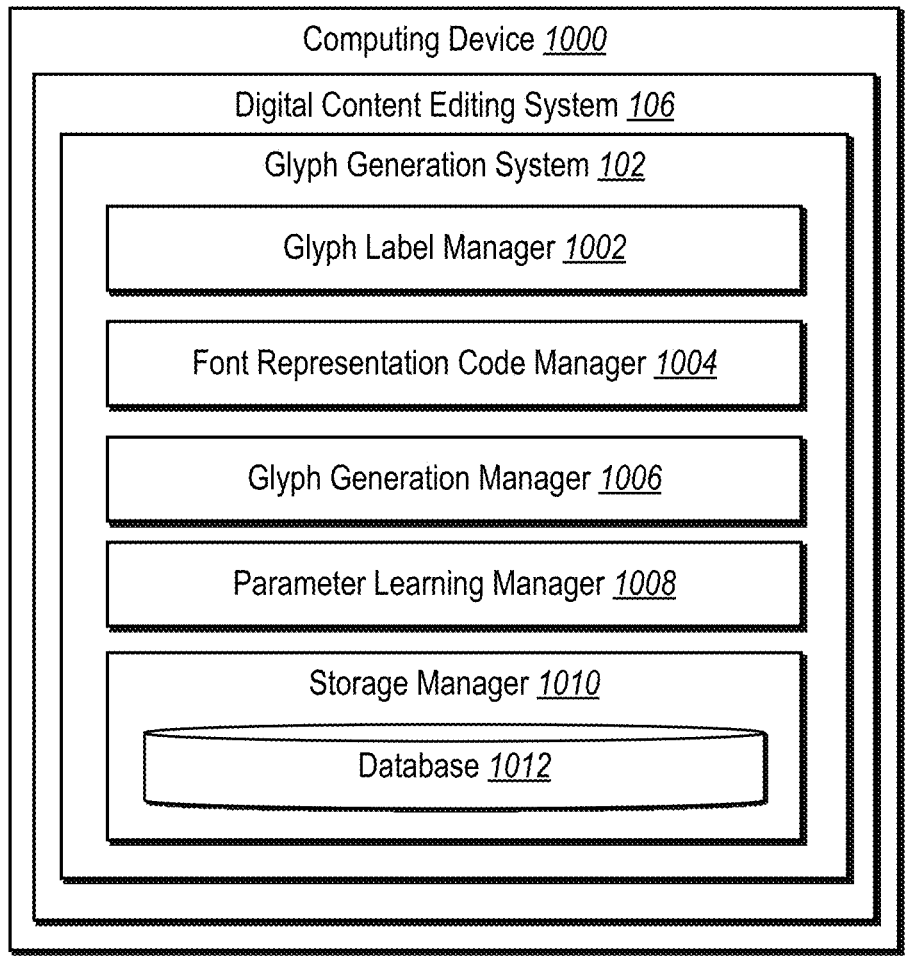
FIG. 10 illustrates a schematic diagram of a glyph generation system in accordance with one or more embodiments.

Looking now to FIG. 10, additional detail will be provided regarding components and capabilities of the glyph generation system 102. Specifically, FIG. 10 illustrates an example schematic diagram of the glyph generation system 102 on an example computing device 1000 (e.g., one or more of the client devices 108 and/or the server(s) 104). In some embodiments, the computing device 1000 refers to a distributed computing system where different managers are located on different devices, as described above. As shown in FIG. 10, the glyph generation system 102 includes a glyph label manager 1002, a font representation code manager 1004, a glyph generation manager 1006, a parameter learning manager 1008, and a storage manager 1010.

As just mentioned, the glyph generation system 102 includes a glyph label manager 1002. In particular, the glyph label manager 1002 manages, maintains, determines, generates, receives, detects, or identifies a glyph label for a glyph. For example, the glyph label manager 1002 analyzes a glyph image to determine a character depicted within the glyph image. In some cases, the glyph label manager 1002 generates a vector (e.g., a one hot vector) representing the depicted character. For instance, the glyph label manager 1002 utilizes a text recognition model to determine a glyph label for a particular glyph image.

As illustrated in FIG. 10, the glyph generation system 102 also includes a font representation code manager 1004. In particular, the font representation code manager 1004 manages, maintains, generates, determines, identifies, extracts, or encodes a font representation code corresponding to a particular glyph. For instance, as described herein, the font representation code manager 1004 utilizes an iterative process involving a glyph appearance propagation model to determine a font representation code that corresponds to an initial glyph based on iteratively generating predicted glyphs (from iterative versions of the font representation code which is modified at each iteration) and comparing the predicted glyphs to the initial glyph.

Additionally, the glyph generation system 102 includes a glyph generation manager 1006. In particular, manages, determines, generates, or produces glyphs. More specifically, the glyph generation manager 1006 generates glyphs corresponding to respective glyph labels utilizing a font representation code. For instance, the glyph generation manager 1006 utilizes a glyph appearance propagation model to generate a glyph set with an appearance matching that of an initial glyph based on its font representation code. The glyph generation manager 1006 also generates scaled glyphs and completed glyphs (e.g., from partial glyphs) in accordance with this disclosure.

Further, the glyph generation system 102 includes a parameter learning manager 1008. In particular, the parameter learning manager 1008 learns parameters for a glyph appearance propagation model (including an encoder neural network, multiple decoder neural networks, and a SIREN network) utilizing a training or tuning process. For instance, the parameter learning manager 1008 implements an iterative training process as described above to learn parameters for accurately generating glyph images by indicating values at particular pixel locations. In some cases, the parameter learning manager 1008 utilizes an adaptive sampling technique for dense sampling along boundaries and sparse sampling in other portions of a glyph image, which enables scaling glyphs without degradation.

The glyph generation system 102 further includes a storage manager 1010. The storage manager 1010 operates in conjunction with, or includes, one or more memory devices such as the database 1012 (e.g., the database 112) that store various data such as a glyph appearance propagation model, font representation codes, glyph images, and glyph labels.

In one or more embodiments, each of the components of the glyph generation system 102 are in communication with one another using any suitable communication technologies. Additionally, the components of the glyph generation system 102 is in communication with one or more other devices including one or more client devices described above. It will be recognized that although the components of the glyph generation system 102 are shown to be separate in FIG. 10, any of the subcomponents may be combined into fewer components, such as into a single component, or divided into more components as may serve a particular implementation. Furthermore, although the components of FIG. 10 are described in connection with the glyph generation system 102, at least some of the components for performing operations in conjunction with the glyph generation system 102 described herein may be implemented on other devices within the environment.

The components of the glyph generation system 102 can include software, hardware, or both. For example, the components of the glyph generation system 102 can include one or more instructions stored on a computer-readable storage medium and executable by processors of one or more computing devices (e.g., the computing device 1000). When executed by the one or more processors, the computer-executable instructions of the glyph generation system 102 can cause the computing device 1000 to perform the methods described herein. Alternatively, the components of the glyph generation system 102 can comprise hardware, such as a special purpose processing device to perform a certain function or group of functions. Additionally, or alternatively, the components of the glyph generation system 102 can include a combination of computer-executable instructions and hardware.

Furthermore, the components of the glyph generation system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the glyph generation system 102 may be implemented as part of a stand-alone application on a personal computing device or a mobile device. Alternatively, or additionally, the components of the glyph generation system 102 may be implemented in any application that allows creation and delivery of marketing content to users, including, but not limited to, applications in ADOBE® EXPERIENCE MANAGER and CREATIVE CLOUD®, such as ADOBE FONTS®, PHOTOSHOP®, LIGHTROOM®, and INDESIGN®. "ADOBE," "ADOBE EXPERIENCE MANAGER," "CREATIVE CLOUD," "ADOBE FONTS," "PHOTOSHOP," "LIGHTROOM," and "INDESIGN" are either registered trademarks or trademarks of Adobe Inc. in the United States and/or other countries.

FIGS. 1-10 the corresponding text, and the examples provide a number of different systems, methods, and non-transitory computer readable media for a machine learning approach for generating scalable and semantically editable font representations. In addition to the foregoing, embodiments can also be described in terms of flowcharts comprising acts for accomplishing a particular result. For example, FIG. 11 illustrates a flowchart of an example sequence or series of acts in accordance with one or more embodiments.

Figure 11:
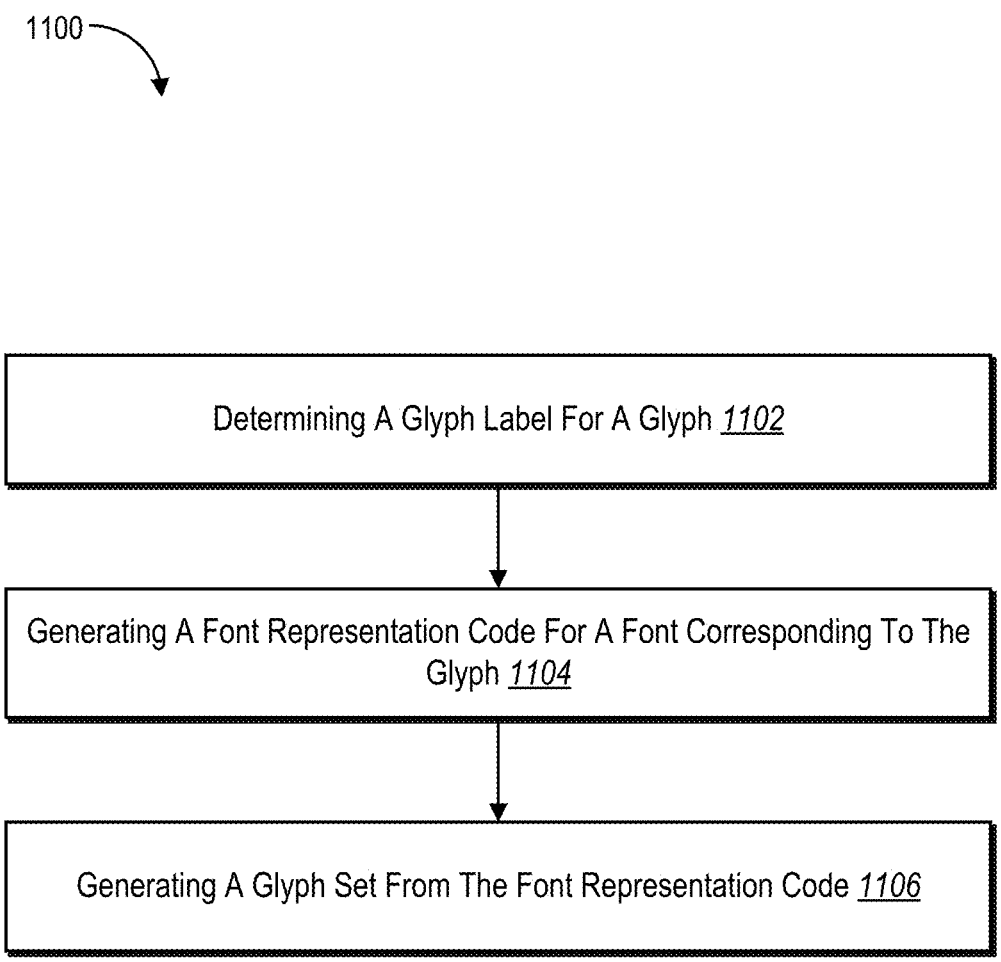
FIG. 11 illustrates a flowchart of a series of acts for generating scalable and semantically editable font representations utilizing a machine learning approach in accordance with one or more embodiments.

While FIG. 11 illustrates acts according to particular embodiments, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11. Additionally, the acts described herein may be repeated or performed in parallel with one another or in parallel with different instances of the same or other similar acts.

FIG. 11 illustrates an example series of acts 1100 for a machine learning approach for generating scalable and semantically editable font representations. In particular, the series of acts 1100 includes an act 1102 of determining a glyph label for a glyph. For example, the series of acts 1102 involves determining a glyph label for a glyph utilizing a text recognition model. In some embodiments, the act 1102 involves utilizing the text recognition model to generate a one hot vector representing the glyph. In certain cases, the act 1102 involves utilizing the glyph appearance propagation model to generate a vector with a size corresponding to a plurality of anchor fonts and comprising indications of one or more of the plurality of anchor fonts contributing to a makeup of the font representation code.

In addition, the series of acts 1100 includes an act 1104 of generating a font representation code for a font corresponding to the glyph. In particular, the act 1104 can include generating, from the glyph label and the glyph utilizing a glyph appearance propagation model, a font representation code for a font corresponding to the glyph. For example, the act 1104 involves iteratively generating predicted glyphs from respective predicted font representation codes and the glyph label utilizing the glyph appearance propagation model, comparing the predicted glyphs to the glyph at respective iterations, selecting, from the comparison and as the font representation code for the font corresponding to the glyph, a predicted font representation code corresponding to a predicted glyph that satisfies a similarity metric in relation to the glyph. In certain embodiments, the act 1104 involves utilizing the glyph appearance propagation model to generate a hybrid font representation code representing an interpolation between anchor fonts. In certain implementations, the glyph appearance propagation model includes an encoder neural network, a plurality of decoder neural networks, and a SIREN network.

In some cases, the act 1104 involves iteratively generating, utilizing the glyph appearance propagation model, predicted glyphs from a glyph label for the glyph and iteratively modified versions of a predicted font representation code, comparing the glyph and the iteratively generated predicted glyphs, and selecting, as the font representation code for the font and from the comparison, an iteratively modified version of the predicted font representation code corresponding to a predicted glyph that satisfies a similarity metric. Iteratively generating the predicted glyph sometimes includes utilizing the glyph appearance propagation model for a number of iterations to generate, for each iteration of the number of iterations, a respective predicted glyph from a respective version of the predicted font representation code and the glyph label. Comparing the glyph and the iteratively generated predicted glyphs can involve determining, for each of the iteratively generated predicted glyphs, a loss between the glyph and the iteratively generated predicted glyph. Selecting the iteratively modified version of the predicted font representation code sometimes involves selecting, from the comparison, an iteratively modified version of the predicted font representation code corresponding to a predicted glyph that satisfies a threshold loss.

As illustrated in FIG. 11, the series of acts 1100 also includes an act 1106 of generating a glyph set from the font representation code. In particular, the act 1106 can involve generating, utilizing the glyph appearance propagation model, a glyph set from the font representation code and a set of glyph labels. For example, the act 1106 involves utilizing the glyph appearance propagation model to generate a new glyph for each glyph label from the set of glyph labels according to the font representation code.

In certain embodiments, the series of acts 1100 includes an act of receiving an indication from a client device of a modification to the glyph. In addition, the series of acts 1100 includes an act of automatically propagate the modification to other glyphs within the glyph set. Automatically propagating the modification to other glyphs within the glyph set sometimes involves generating an updated font representation code for an updated font corresponding to the modified glyph and generating updated glyphs for the glyph set from the updated font representation code and the set of glyph labels. For example, the series of acts 1100 includes acts of receiving an indication from a client device of a modified appearance (e.g., one or more modified pixels) to the glyph and automatically propagating the modified appearance to other glyphs within a common glyph set utilizing the glyph appearance propagation model (e.g., to match an appearance resulting from the one or more modified pixels).

In one or more implementations, the series of acts 1100 includes an act of resizing one or more glyphs from the glyph set to an arbitrary scale according to parameters of the glyph appearance propagation model learned via adaptive sampling along boundaries of sample glyphs. In these or other embodiments, the series of acts 1100 includes an act of normalizing the glyph for utilizing the text recognition model to determining the glyph label. For instance, the series of acts 1100 includes acts of receiving an indication from a client device to resize the glyph to a larger scale and resizing the glyph according to the indication to the larger scale without degrading an appearance of the glyph.

In one or more embodiments, the series of acts 1100 includes acts of generating, utilizing the glyph appearance propagation model, a glyph set from the font representation code and a set of glyph labels, receiving an indication from a client device to resize one or more glyphs of the glyph set to a larger scale, and resizing, without degrading appearance, the one or more glyphs to the larger scale according to parameters of the glyph appearance propagation model learned via adaptive sampling along boundaries of sample glyphs.

In some embodiments, the series of acts 1100 includes an act of receiving a partial glyph depicting an incomplete representation of a glyph. In these or other embodiments, the series of acts 1100 includes an act of generating, from the partial glyph utilizing the glyph appearance propagation model, a different font representation code for a different font corresponding to the partial glyph. Further, the series of acts 1100 includes an act of generating, utilizing the glyph appearance propagation model, a completed glyph from the different font representation code and a glyph label for the partial glyph.

In some cases, the series of acts 1100 includes an act of generating, utilizing a first neural network within the glyph appearance propagation model, parameters for a second neural network within the glyph appearance propagation model. For example, generating the parameters for the second neural network utilizing the first neural network sometimes includes extracting a latent vector from the glyph label and the font representation code utilizing an encoder neural network within the first neural network and generating weights and biases for the second neural network from the latent vector utilizing a plurality of decoder neural networks within the first neural network. In some embodiments, the series of acts 1100 includes an act of generating the glyph set by predicting values indicating glyph surfaces and background areas for a set of coordinate locations utilizing the second neural network according to the weights and biases.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
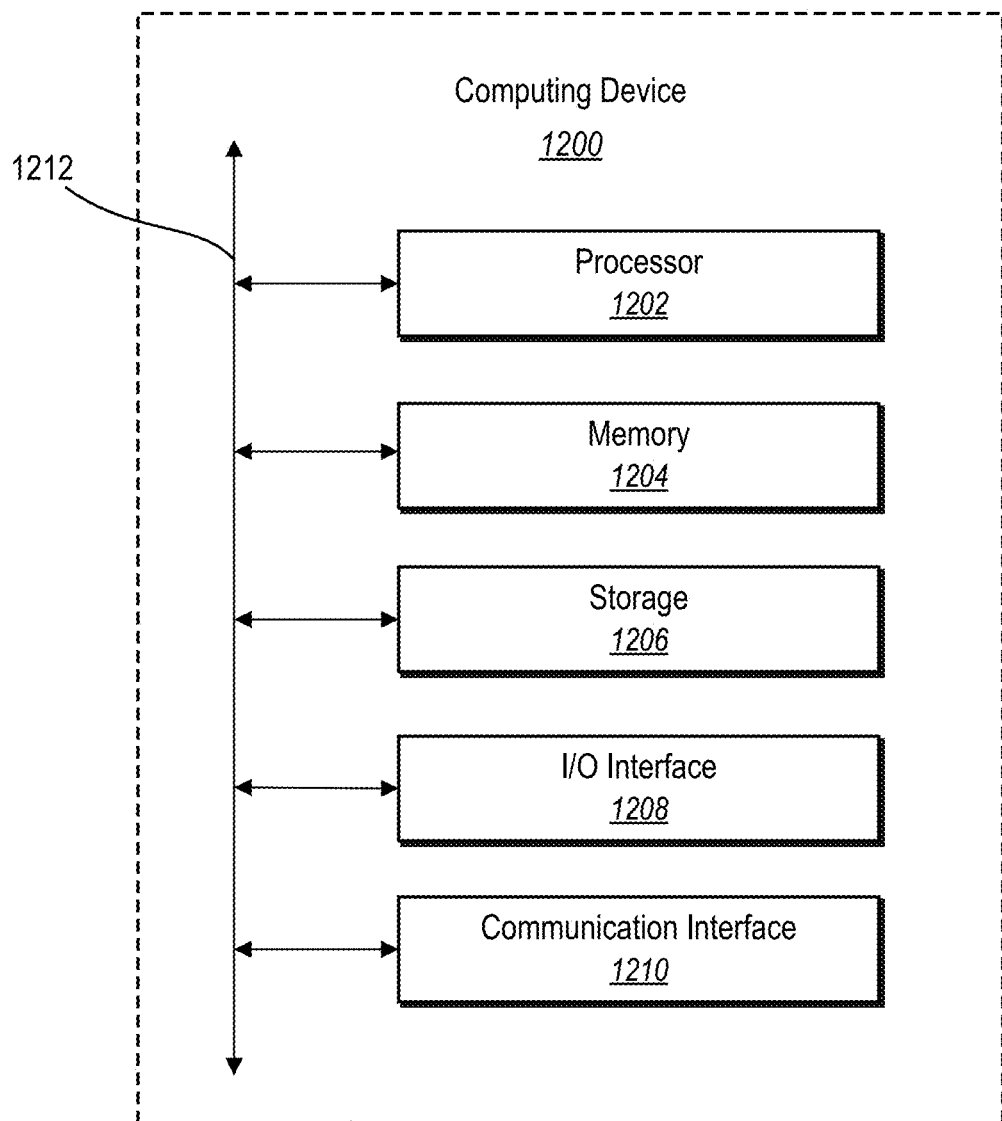
FIG. 12 illustrates a block diagram of an example computing device in accordance with one or more embodiments.

FIG. 12 illustrates, in block diagram form, an example computing device 1200 (e.g., the computing device 1000, the client device 108, and/or the server(s) 104) that may be configured to perform one or more of the processes described above. One will appreciate that the glyph generation system 102 can comprise implementations of the computing device 1200. As shown by FIG. 12, the computing device can comprise a processor 1202, memory 1204, a storage device 1206, an I/O interface 1208, and a communication interface 1210. Furthermore, the computing device 1200 can include an input device such as a touchscreen, mouse, keyboard, etc. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive (HDD), flash memory, a Universal Serial Bus (USB) drive or a combination of these or other storage devices.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a writing device or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computing device to:
   determine a glyph label for a glyph image utilizing a text recognition model;
   generate, from the glyph label and the glyph image, a font representation code for a font corresponding to the glyph image by implementing an iterative code generation process that involves utilizing a glyph appearance propagation model to generate and update font representation codes over multiple iterations by:
      iteratively generating, utilizing the glyph appearance propagation model, predicted glyph images from the glyph label for the glyph image and iteratively modified versions of a predicted font representation code; and
      selecting, as the font representation code for the font, an iteratively modified version of the predicted font representation code corresponding to an iteratively generated predicted glyph image; and
   generate, utilizing the glyph appearance propagation model, a glyph set from the font representation code and a set of glyph labels.

2. The non-transitory computer readable medium of claim 1, further comprising instructions that, when executed by the at least one processor, cause the computing device to generate, utilizing a first neural network within the glyph appearance propagation model, parameters for a second neural network within the glyph appearance propagation model.

3. The non-transitory computer readable medium of claim 2, further comprising instructions that, when executed by the at least one processor, cause the computing device to generate the parameters for the second neural network utilizing the first neural network by:
   extracting a latent vector from the glyph label and the font representation code utilizing an encoder neural network within the first neural network; and
   generating weights and biases for the second neural network from the latent vector utilizing a plurality of decoder neural networks within the first neural network.

4. The non-transitory computer readable medium of claim 3, further comprising instructions that, when executed by the at least one processor, cause the computing device to generate the glyph set by predicting values indicating glyph surfaces and background areas for a set of coordinate locations utilizing the second neural network according to the weights and biases.

5. The non-transitory computer readable medium of claim 1, wherein the iterative code generation process comprises:
   iteratively generating predicted glyph images from respective predicted font representation codes and the glyph label utilizing the glyph appearance propagation model;
   comparing the predicted glyph images to the glyph image at respective iterations; and
   selecting, from the comparison and as the font representation code for the font corresponding to the glyph image, a predicted font representation code corresponding to a predicted glyph that satisfies a similarity metric in relation to the glyph image.

6. The non-transitory computer readable medium of claim 1, further comprising instructions that, when executed by the at least one processor, cause the computing device to generate the glyph set by utilizing the glyph appearance propagation model to generate a new glyph image for each glyph label from the set of glyph labels according to the font representation code.

7. The non-transitory computer readable medium of claim 1, further comprising instructions that, when executed by the at least one processor, cause the computing device to:
   Receive an indication from a client device to generate a modified glyph image by applying a modification to the glyph image; and
   automatically propagate the modification to other glyph images within the glyph set by:
   generating an updated font representation code for an updated font corresponding to the modified glyph image; and
   generating updated glyph images for the glyph set from the updated font representation code and the set of glyph labels.

8. The non-transitory computer readable medium of claim 1, further comprising instructions that, when executed by the at least one processor, cause the computing device to generate the font representation code by utilizing the glyph appearance propagation model to generate a vector with a size corresponding to a plurality of anchor fonts and comprising indications of one or more of the plurality of anchor fonts contributing to a makeup of the font representation code.

9. A system comprising:
   one or more memory devices comprising a glyph image and a glyph appearance propagation model that is previously trained; and
   one or more processors that are configured to cause the system to:
   generate a font representation code for a font corresponding to the glyph image by implementing an iterative code generation process that involves utilizing the glyph appearance propagation model to generate and update font representation codes over multiple iterations by:
   iteratively generating, utilizing the glyph appearance propagation model, predicted glyph images from a glyph label for the glyph image and iteratively modified versions of a predicted font representation code;
   comparing the glyph image and the iteratively generated predicted glyph images; and
   selecting, as the font representation code for the font and from the comparison, an iteratively modified version of the predicted font representation code corresponding to a predicted glyph image that satisfies a similarity metric.

10. The system of claim 9, wherein the one or more processors are further configured to cause the system to iteratively generate the predicted glyph images by utilizing the glyph appearance propagation model for a number of iterations to generate, for each iteration of the number of iterations, a respective predicted glyph from a respective version of the predicted font representation code and the glyph label.

11. The system of claim 9, wherein:
   comparing the glyph image and the iteratively generated predicted glyph images comprises determining, for each of the iteratively generated predicted glyph images, a loss between the glyph image and the iteratively generated predicted glyph images; and
   selecting the iteratively modified version of the predicted font representation code comprises selecting, from the comparison, an iteratively modified version of the predicted font representation code corresponding to a predicted glyph image that satisfies a threshold loss.

12. The system of claim 9, wherein the one or more processors are further configured to cause the system to generate the font representation code by utilizing the glyph appearance propagation model to generate a hybrid font representation code representing an interpolation between anchor fonts.

13. The system of claim 9, wherein the one or more processors are further configured to cause the system to:
   generate, utilizing the glyph appearance propagation model, a glyph set from the font representation code and a set of glyph labels;
   receive an indication from a client device to resize one or more glyph images of the glyph set to a larger scale; and
   resize, without degrading appearance, the one or more glyph images to the larger scale according to parameters of the glyph appearance propagation model learned via adaptive sampling along boundaries of sample glyph images.

14. The system of claim 9, wherein the one or more processors are further configured to cause the system to:
   receive an indication from a client device of a modified appearance to the glyph image; and
   automatically propagate the modified appearance to other glyph images within a common glyph set utilizing the glyph appearance propagation model.

15. The system of claim 9, wherein the one or more processors are further configured to cause the system to:
   receive a partial glyph image depicting an incomplete representation of a glyph;
   generate, from the partial glyph image utilizing the glyph appearance propagation model, a different font representation code for a different font corresponding to the partial glyph image; and
   generate, utilizing the glyph appearance propagation model, a completed glyph image from the different font representation code and a glyph label for the partial glyph image.

16. The system of claim 9, wherein the one or more processors are further configured to cause the system to utilize the glyph appearance propagation model comprising an encoder neural network, a plurality of decoder neural networks, and a SIREN network.

17. A computer-implemented method comprising:
   determining a glyph label for a glyph image utilizing a text recognition model;
   generating, from the glyph label and the glyph image, a font representation code for a font corresponding to the glyph image by implementing an iterative code generation process that involves utilizing a glyph appearance propagation model to generate and update representation codes over multiple iterations, by:
   iteratively generating, utilizing the glyph appearance propagation model, predicted glyph images from the glyph label for the glyph image and iteratively modified versions of a predicted font representation code; and
   selecting, as the font representation code for the font, an iteratively modified version of the predicted font representation code corresponding to an iteratively generated predicted glyph image; and
   generating, utilizing the glyph appearance model, a glyph set from the font representation code and a set of glyph labels.

18. The computer-implemented method of claim 17, further comprising:
- receiving an indication from a client device of a modification to the glyph image; and
- automatically propagating the modification to other glyph images within the glyph set.

19. The computer-implemented method of claim 18, wherein:
- receiving the indication of the modification comprises receiving an indication of one or more modified pixels of the glyph image; and
- automatically propagating the modification comprises automatically modifying the other glyph images within the glyph set to match an appearance resulting from the one or more modified pixels of the glyph image.

20. The computer-implemented method of claim 17, further comprising:
- receiving an indication from a client device to resize the glyph image to a larger scale; and
- resizing the glyph image according to the indication to the larger scale without degrading an appearance of the glyph image.

* * * * *